US012570570B2

(12) United States Patent
Fotheringham et al.

(10) Patent No.: US 12,570,570 B2
(45) Date of Patent: Mar. 10, 2026

(54) GLASSES WITH IMPROVED ION EXCHANGEABILITY

(71) Applicant: Schott AG, Mainz (DE)

(72) Inventors: Ulrich Fotheringham, Wiesbaden (DE); Holger Wegener, Alfeld (DE); Oliver Hochrein, Mainz (DE); Simone Monika Ritter, Mainz (DE); Wolfgang Mannstadt, Münster-Sarmsheim (DE); Christoph Berndhäuser, Nieder-Olm (DE); Christoph Groß, Mainz (DE)

(73) Assignee: Schott AG, Mainz (DE)

( * ) Notice: Subject to any disclaimer, the term of this patent is extended or adjusted under 35 U.S.C. 154(b) by 1735 days.

(21) Appl. No.: 16/460,084

(22) Filed: Jul. 2, 2019

(65) Prior Publication Data

US 2020/0010355 A1     Jan. 9, 2020

(30) Foreign Application Priority Data

Jul. 6, 2018     (DE) ..................... 10 2018 116 461.0

(51) Int. Cl.
| | |
|---|---|
| *C03C 3/093* | (2006.01) |
| *C03C 3/066* | (2006.01) |
| *C03C 4/18* | (2006.01) |
| *C03C 4/20* | (2006.01) |

(52) U.S. Cl.
CPC .............. *C03C 3/093* (2013.01); *C03C 3/066* (2013.01); *C03C 4/18* (2013.01); *C03C 4/20* (2013.01); *C03C 2204/00* (2013.01)

(58) Field of Classification Search
CPC ........... C03C 3/093; C03C 3/066; C03C 4/18; C03C 4/20; C03C 2204/00; C03C 3/091; C03C 3/089; C03C 3/083; C03C 3/085
See application file for complete search history.

(56) References Cited

U.S. PATENT DOCUMENTS

| | | | |
|---|---|---|---|
| 5,736,476 | A | 4/1998 | Watzke et al. |
| 8,518,545 | B2 | 8/2013 | Akiba et al. |
| 8,715,829 | B2 | 5/2014 | Akiba et al. |
| 9,060,435 | B2 | 6/2015 | Akiba et al. |
| 9,156,725 | B2 | 10/2015 | Dejneka et al. |
| 9,517,967 | B2 | 12/2016 | Dejneka et al. |
| 9,701,580 | B2 | 7/2017 | Smedskjaer et al. |
| 9,783,453 | B2 | 10/2017 | Gross |
| 9,822,032 | B2 | 11/2017 | Dejneka et al. |
| 9,890,073 | B2 | 2/2018 | Kase |
| 9,896,374 | B2 | 2/2018 | Akiba et al. |
| 9,914,660 | B2 | 3/2018 | Schreder et al. |
| 2013/0004758 | A1 | 1/2013 | Dejneka et al. |
| 2014/0050911 | A1 | 2/2014 | Mauro et al. |
| 2014/0364298 | A1 | 12/2014 | Ohara et al. |
| 2015/0030827 | A1 | 1/2015 | Gomez et al. |
| 2015/0140299 | A1 | 5/2015 | Ellison et al. |
| 2015/0147575 | A1 | 5/2015 | Dejneka et al. |
| 2015/0329406 | A1 | 11/2015 | Kawamoto et al. |
| 2016/0083288 | A1 | 3/2016 | Kase et al. |
| 2016/0251255 | A1 | 9/2016 | Gross et al. |
| 2016/0355430 | A1 | 12/2016 | Yamazaki et al. |
| 2016/0355431 | A1 | 12/2016 | Akiba et al. |
| 2017/0001903 | A1 | 1/2017 | Miyasaka et al. |
| 2017/0107141 | A1 | 4/2017 | Miyasaka et al. |
| 2017/0121220 | A1 | 5/2017 | Miyasaka et al. |
| 2017/0217825 | A1 | 8/2017 | Hasegawa et al. |
| 2017/0260077 | A1 | 9/2017 | Kase et al. |
| 2017/0305789 | A1 | 10/2017 | Fuji et al. |
| 2017/0320769 | A1 | 11/2017 | Guo et al. |
| 2021/0253471 | A1 | 8/2021 | Gross et al. |

FOREIGN PATENT DOCUMENTS

| | | | |
|---|---|---|---|
| CN | 102417301 A | * | 4/2012 |
| DE | 10 2013 114 225 A1 | | 6/2015 |
| DE | 10 2014 119 594 A1 | | 6/2016 |
| DE | 10 2015 116 097 A1 | | 3/2017 |

(Continued)

OTHER PUBLICATIONS

Shelby, JE, Introduction to Glass Science and Technology, 2005, The Royal Society of Chemisry, 2nd, pp. i-xvi and 26-50. (Year : 2005).*

"On determining chemical durability of glasses", Susanne Fagerlund, Paul Ek, Mikko Hupa & Leena Hupa, Glass Technology: European Journal of Glass Science and Technology, Part A, vol. 51, No. 6, pp. 235-240, Dec. 2010 (6 pages).

"Chemical structure, medium range order, and crystalline reference state of multicomponent oxide liquids and glasses", Reinhard Conradt, Journal of Non-Crystalline Solids, vols. 345-346, pp. 16-23, Oct. 15, 2004 (8 pages).

"Dissociation Constants of Inorganic Acids and Bases in Aqueous Solution", D.D. Perrin, Pure Appl. Chem., vol. 20, No. 2, digit 176, digit 15, digit 12, digit 115, digit 18, digit 180, digit 178, digit 164, digit 149, 1969, pp. 133-236, (104 pages).

(Continued)

*Primary Examiner* — Elizabeth A. Bolden
(74) *Attorney, Agent, or Firm* — TAYLOR & EDELSTEIN, PC

(57)     ABSTRACT

The present invention relates to glasses, such as e.g. thin or thinnest glasses, but also to glasses for the production of tubular glass, carpules and syringes as well as other pharmaceutical vessels. The glasses are characterized by a high chemical prestressability (tem-perability) with very well alkali, hydrolytic and/or acid resistance as well as an advantageous coefficient of thermal expansion. The glass has a composition characterized by the following constituent phases: 0-60 mol % reedmergnerite; 20-60 mol % albite; 0-30 mol % orthoclase; 0-20 mol % natrosilite; 0-20 mol % sodium metasilicate; 0-20 mol % parakeldyshite; 0-20 mol % narsarsukite; 0-20 mol % disodium zinc silicate; 0-21 mol % cordierite; and 0-20 mol % danburite. A quotient of a coefficient of thermal expansion of the glass multiplied by 1000 (in ppm/K) and the product of a pH value and a removal rate in alkaline environment (in mg/(dm$^2$3 h)) according to ISO 695 is at least 9.0.

18 Claims, No Drawings

(56)                 References Cited

FOREIGN PATENT DOCUMENTS

| EP | 2 474 511 A1 | 7/2012 |
|----|----|----|
| JP | 2012-136431 A | 7/2012 |
| JP | 2013-047174 A | 3/2013 |
| JP | 2016-044119 A | 4/2016 |
| KR | 10-2013-0023101 A | 3/2013 |
| WO | 2015/031427 A2 | 3/2015 |
| WO | 2015/091134 A1 | 6/2015 |
| WO | 2017/151771 A1 | 9/2017 |

OTHER PUBLICATIONS

"Water Treatment Unit Processes: Physical and Chemical", David W. Hendricks, Taylor and Francis Group, Boca Raton, London, New York, p. 307, 2006 (18 pages).

"The biological inorganic chemistry of zinc ions", Artur Krezel and Wolfgang Maret, Archives of Biochemistry and Biophysics, p. 1-17, (2016) (17 pages).

"On the glass transition in vitreous silica by differential thermal analysis measurements", Ralf Brüning, Journal of Non-Crystalline Solids 330, p. 13-22, 2003 (10 pages).

"First-Principles Ionicity Scales", Alberto García and Marvin L. Cohen, Physical Review B, vol. 47, No. 8, Feb. 15, 1993 (6 pages).

"The coordination Nos. of Na and K atoms in low albite and microline as determined from a procrystal electron-density distribution", Robert T. Downs, Aaron Andalman and Marc Hudacsko, American Mineralogist, vol. 81, pp. 1344-1349, 1996 (6 pages).

"Structural effects of the incorporation of large-radius alkalis in high cordierite", Peter Daniels, American Mineralogist, vol. 77, pp. 407-411, 1992 (5 pages).

H. Föll, lecture notes of the lecture "Einführung in die Materialwissenschaft I", Christian Albrechts University Kiel, pp. 79-83 (415 pages).

"Inorganic speciation of dissolved elements in seawater: the influence of pH on concentration ratios", Robert H. Byrne, Geochem. Trans. 3(2), p. 11-16, 2002 (6 pages).

"The crystal structures of high albite and monalbite at hight temperatuers", C.T. Prewitt, S. Sueno and J.J. Papike, American Mineralogist, vol. 61, pp. 1213-1225, 1976 (13 pages).

"A high-temperature study of the thermal expansion and the anisotropy of the sodium atom in low albite", John K. Winter, Subrata Ghose and Fujio P. Okamura, American Mineralogist, vol. 62, pp. 921-931, 1977 (11 pages).

"A high-temperature structural study of high albite, monalbite, and the analbite-monalbite phase transition", John K. Winter, Fujio P. Okamura and Subrata Ghose, American Mineralogist, vol. 64, pp. 409-423, 1979 (15 pages).

"Whence Orthoclase and Microcline? A Crystallographer's Interpretation of Potassium Feldspar Phase Relations", Robert B. Ferguson, The Canadian Mineralogist, vol. 17, pp. 515-525, Aug. 1979 (11 pages).

"Crystal Structure of Reedmergnerite, A Boron Albite, and It's Relation to Feldspar Crystal Chemistry", Daniel E. Appleman and Joan R. Clark, The American Mineralogist, vol. 50, pp. 1827-1850, Nov.-Dec. 1965 (24 pages).

"The Crystal Structure of Danburite: A Comparison with Anorthite, Albite, and Reedmergnerite", Michael W. Phillips, G.V. Gibbs, and P.H. Ribbe, American Mineralogist, vol. 59, pp. 79-85, 1974 (7 pages).

"Determination of the Substructure of Na2ZNSi2O6, Synthesised in the Solid State", Jekabs Grins, Per-Erik Werner and Yoshinori Kanno, Acta Chemica Scandinavica 51, pp. 259-263, 1997 (5 pages).

"The Determination and Refinement of the Structure of Narsarsukite, Na2TiOSi4O10", Donald R. Peacor and M.J. Buerger, The American Mineralogist, vol. 47 and vol. 67, pp. 539-556. May-Jun. 1962 (18 pages).

"Disodium Zincosilicate, Na2ZnSi3O8", K.-F Hesse, F. Liebau and H. Bohm, Acta Cryst. B33, pp. 1333-1337, 1977 (5 pages).

Jantzen, Williams, WM2008 Conference Phoenix Arizona: "natrosilite hydrate which is calcined at 600-800° C. results in delta-natrosilite, wherein the latter comprises an Na with a coordination number of 5 and an Na with a coordination number of 6", Feb. 24-28, 2008 (15 pages).

"Ion exchange strengthening and thermal expansion of glasses: Common origin and critical role of network connectivity", Mengyi Wang et al., Journal of Non-Crystalline Solids, 455, pp. 70-74, 2017 (5 pages).

"Sodium self diffusion in natural minerals", Robert F. Sippel, Geochimica et Cosmochimica Acta, vol. 27, pp. 107-120, 1963 (14 pages).

"29Si- und 23Na-Festkörper-MAS-NMR-Untersuchungen an Modifikationen des Na2Si2O5", D. Heidemann, C. Hübert, W. Schwieger, P. Grabner, K.-H. Bergk, P. Sarv, Z. anorg. allg. Chem. 617, pp. 169-177, 1992 (9 pages).

"Test of Anderson-Stuart model in sodium silicate glasses and the general Arrhenian conductivity rule in wide composition range", M. L. F. Nascimento, E. Nascimento, W. M. Pontuschka, M.Matsuoka, S.Watanabe, Cerâmica 52, pp. 22-30, 2006 (8 pages).

"Optical Basicity and Nepheline Crystallization in High Alumina Glasses", C.P. Rodriguez, J.S. McCloy, M.J. Schweiger, J.V. Crum, A, Winschell, Pacific Northwest National Laboratories, PNNL 20184, EMSP-RPT 003, prepared for the US Department of Energy under contract DE-AC05-76RL01830 (92 pages).

"Calculation of Activation Energy of Ionic Conductivity in Silica Glasses by Classical Methods", O.L. Anderson and D.A. Stuart, Journal of the American Ceramic Society, vol. 37, No. 12, pp. 573-580, 1954 (8 pages).

"Aqueous corrosion of borosilicate glass under acidic conditions: A new corrosion mechanism", T. Geisler, A. Janssen, D. Scheiter, T. Stephan, J. Berndt, A. Putnis, Journal of Non-Crystalline Solids 356, pp. 1458-1465, 2010 (8 pages).

"An 170 NMR Investigation of Crystalline Sodium Metasilicate: Implications for the Determination of Local Structure in Alkali Silicates", T.M. Clark, P.J. Grandinetti, P. Florian and J.F. Stebbins, J. Phys Chem. B 105, pp. 12257-12265, 2001 (9 pages).

"The Electrical Conductivity of Sodium Metasilicate-Silica Glasses", E. Seddon et al., JSGT_V16_T4540-T477, May 25, 1932 (30 pages).

German Office Action dated Mar. 13, 2019 for German Application No. 10 2018 116 461.0 (2 pages).

Machine translation of German Office Action dated Mar. 13, 2019 for German Application No. 10 2018 116 461.0 (3 pages).

Chinese Office Action dated May 16, 2022 for Chinese Patent Application No. 201910611777.4 (8 pages).

English translation of Korean Office Action dated Nov. 13, 2023 for Korean Patent Application No. 10-2019-0081613 (9 pages).

* cited by examiner

GLASSES WITH IMPROVED ION EXCHANGEABILITY

BACKGROUND OF THE INVENTION

1. Field of the Invention

The present invention relates to glasses, such as e.g. thin or thinnest glasses, but also glasses for the production of tubular glass, cartridges and syringes as well as other pharmaceutical vessels. The glasses are characterized by a high chemical prestressability (temperability) with very good alkali, hydrolytic and/or acid resistance as well as an advantageous coefficient of thermal expansion. The present invention also relates to methods for the production of such glasses and their uses.

2. Description of the Related Art

Chemically temperable glasses are required for many uses, in particular for uses in the fields of pharmaceutical packaging means or touch-sensitive displays (touch panel). Here, generally, a certain coefficient of thermal expansion is still required and, despite, inter alia, the sodium ions which are present in large number by reason of prestressability, it is not allowed to compromise the alkali, hydrolytic and acid resistance. Today, for the characterization of the chemical stability there is an abundance of regulations and standards, in particular ISO 695 for the alkali resistance, ISO 719/720 for the hydrolytic as well as ISO 1776 and DIN 12116 for the acid resistance.

Also the scratch resistance and impact strength are important for many glasses, but in particular in the case of glasses for display uses, thus e.g. as cover glasses for smartphones or other electronic apparatuses. While many glasses achieve a good chemical temperability, often the scratch resistance of such glasses is less pronounced.

DE 10 2015 116097 A1, U.S. Pat. No. 9,783,453 B2, US 2015/030827 A1, U.S. Pat. No. 9,701,580 B2, U.S. Pat. No. 9,156,725 B2, U.S. Pat. No. 9,517,967 B2, US 2014/050911 A1, U.S. Pat. No. 9,822,032 B2, US 2015/147575 A1, US 2015/140299 A1, WO 2015/031427 A2, US 2017/320769 A1, WO 2017/151771 A1, US 2016/251255 A1, DE 10 2013 114225 A1 teach glasses which are intended for the use in the field of touch panels. But with respect to the chemical temperability for the glasses a high proportion of glass-like albite (12.5 mol % of Na₂O, 12.5 mol % of Al₂O₃, 75 mol % of SiO2) is emphasized as constituent phase, wherein other phases which may have a positive influence onto the chemical temperability are not discussed.

The selection of glass-like albite as main constituent was due to the high mobility of sodium ions in this glass system with which a high exchange depth (depth of layer) (typically 30 to 50 μm) can be achieved in the case of chemical tempering by exchange of sodium with potassium. Also, the mineral albite is characterized by a high mobility of sodium ions. The extent of compressive stress in the layer near to the surface does not depend on this mobility, but on the concentration of sodium in the starting glass.

For thinnest glasses (<100 μm) this mobility is not so important than for thin glasses with typical thicknesses of 500 μm to 1000 μm. In the latter case it is reasonable to provide exchange depths of up to 50 μm for guaranteeing that also in the case of deep cracks the tip of the crack is within the zone of compressive stress. In the first case due to the dimensions this would be nonsensical.

Since the high mobility of the sodium ions in the albite glass is connected with the high proportion of aluminum (the boron analog of albite, reedmergnerite, is characterized by a considerably lower mobility of the sodium ions) and a high proportion of aluminum dramatically decreases the acid resistance, it is reasonable for thinnest glasses to use also other sodium sources besides albite glass, e.g. the mentioned reedmergnerite or ordinary sodium silicate such as natrosilite. The acid resistance of aluminosilicate glasses which are currently available on the market is only class 4 according to DIN 12116.

In the prior art no glasses which combine chemical prestressability with a good chemical stability and especially a good scratch resistance and impact strength can be found. In addition, these glasses should have desired properties of thermal expansion. Furthermore, it should be possible to produce the glasses in modern flat glass drawing processes.

SUMMARY OF THE INVENTION

Exemplary embodiments disclosed herein provide a targeted combination of stoichiometric glasses, thus glasses which in the same stoichiometry also exist as crystals, and the property of which can be assumed to be very similar due to the identical topology of the assemblies each for glass and crystal—as verified in literature in many examples by NMR measurements or the like. Stoichiometric glasses are selected, such that their mixture results in a behavior for various purposes described herein. In this application these stoichiometric glasses are also referred to as "base glasses" or "constituent phases".

DETAILED DESCRIPTION OF THE INVENTION

It is not a new concept to describe glasses on the basis of the constituent phases. With the information about the base glasses it is possible to draw conclusions with respect to the chemical structure of a glass (cf. Conradt R.: "Chemical structure, medium range order, and crystalline reference state of multicomponent oxide liquids and glasses", in Journal of Non-Crystalline Solids, Volumes 345-346, 15 October 2004, pages 16-23).

The present invention relates to a glass having a composition which is characterized by the following phases constituting the glass, wherein, according to the present invention, this base system defined by the constituent phases is limited by the composition ranges mentioned:

TABLE 1

| Constituent phase | Min (mol %) | Max (mol %) |
| --- | --- | --- |
| reedmergnerite | 0 | 60 |
| albite | 20 | 60 |
| orthoclase | 0 | 30 |
| natrosilite | 0 | 20 |
| sodium metasilicate | 0 | 20 |
| parakeldyshite | 0 | 20 |
| narsarsukite | 0 | 20 |
| disodium zinc silicate | 0 | 20 |
| cordierite | 0 | 21 |
| danburite | 0 | 20 |

The base system explicitly relates to the constituent phases and not to the ordinary oxides. However, it follows from the selection of the constituent phases that glasses with a content of aluminum oxide of higher than 12.5 mol %, at most higher than 13 mol % do not allow a reasonable solution within the scope of these constituent phases. Thus, some glasses with a content of aluminum oxide of higher than 13 mol %, in particular higher than 12.5 mol %, after conversion into the oxide composition, are not a part of the present invention. It was shown to be advantageous, when at least 3 mol % or even at least 5 mol % of aluminum oxide are present in the glass.

Furthermore, the glass provided according to the present invention may fulfil further requirements which are associated (with respect to the formula) with the composition of constituent phases and/or the composition of ordinary oxides, wherein this is further explained below.

Since both kinds of relationships—those with respect to a composition which is given in constituent phases and those with respect to a composition which is given in ordinary oxides—are used side by side, a conversion matrix is provided for the mutual conversion of both composition data.

For the purpose of conversion the composition of constituent phases is given in a standardized form which is as follows:

TABLE 2

| Constituent phase | Formula (normalized to an ordinary oxide) |
|---|---|
| reedmergnerite | (Na₂O•B₂O₃•6SiO₂)/8 |
| albite | (Na₂O•Al₂O₃•6SiO₂)/8 |
| orthoclase | (K₂O•Al₂O₃•6SiO₂)/8 |
| natrosilite | (Na₂O•2SiO₂)/3 |
| sodium metasilicate | (Na₂O•SiO₂)/2 |
| parakeldyshite | (Na₂O•ZrO₂•2SiO₂)/4 |
| narsarsukite | (Na₂O•TiO₂•4SiO₂)/6 |
| disodium zinc silicate | (Na₂O•ZnO•3SiO₂)/5 |
| cordierite | (2MgO•2Al₂O₃•5SiO₂)/9 |
| danburite | (CaO•B₂O₃•2SiO₂)/4 |

The conversion of these compositions into composition data in mol % with respect to the following ordinary oxides is conducted with the help of the matrix given in Table 4:

TABLE 3

| # | Oxide |
|---|---|
| 1. | SiO₂ |
| 2. | TiO₂ |
| 3. | ZrO₂ |
| 4. | B₂O₃ |
| 5. | Al₂O₃ |
| 6. | ZnO |
| 7. | MgO |
| 8. | CaO |
| 9. | Na₂O |
| 10. | K₂O |

In this case the composition data in mol % with respect to the base glasses are multiplied as a column vector with the matrix (on the right side thereof):

4

TABLE 4

$$
\begin{pmatrix}
\frac{6}{8} & \frac{6}{8} & \frac{6}{8} & \frac{2}{3} & \frac{1}{2} & \frac{2}{4} & \frac{4}{6} & \frac{3}{5} & \frac{5}{9} & \frac{2}{4} \\
0 & 0 & 0 & 0 & 0 & 0 & 0 & \frac{1}{6} & 0 & 0 \\
0 & 0 & 0 & 0 & 0 & \frac{1}{4} & 0 & 0 & 0 & 0 \\
\frac{1}{8} & 0 & 0 & 0 & 0 & 0 & 0 & 0 & 0 & \frac{1}{4} \\
0 & \frac{1}{8} & \frac{1}{8} & 0 & 0 & 0 & 0 & 0 & 0 & \frac{2}{9} \\
0 & 0 & 0 & 0 & 0 & 0 & 0 & \frac{1}{5} & 0 & 0 \\
0 & 0 & 0 & 0 & 0 & 0 & 0 & 0 & \frac{2}{9} & 0 \\
0 & 0 & 0 & 0 & 0 & 0 & 0 & 0 & 0 & \frac{1}{4} \\
\frac{1}{8} & \frac{1}{8} & 0 & \frac{1}{3} & \frac{1}{2} & \frac{1}{4} & \frac{1}{6} & \frac{1}{5} & 0 & 0 \\
0 & 0 & \frac{1}{8} & 0 & 0 & 0 & 0 & 0 & 0 & 0
\end{pmatrix}
\times
\begin{pmatrix}
(Na_2O \cdot B_2O_3 \cdot 6SiO_2)/8 \\
(Na_2O \cdot Al_2O_3 \cdot 6SiO_2)/8 \\
(K_2O \cdot Al_2O_3 \cdot 6SiO_2)/8 \\
(Na_2O \cdot 2SiO_2)/3 \\
(Na_2O \cdot SiO_2)/2 \\
(Na_2O \cdot ZrO_2 \cdot 2SiO_2)/4 \\
(Na_2O \cdot TiO_2 \cdot 4SiO_2)/6 \\
(Na_2O \cdot ZnO \cdot 3SiO_2)/5 \\
(2MgO \cdot 2Al_2O_3 \cdot 5SiO_2)/9 \\
(CaO \cdot B_2O_3 \cdot 2SiO_2)/4
\end{pmatrix}
$$

The result of the multiplication of the column vector with the matrix is the composition of the glass in mole percentages.

Conversely, it is possible, simply to convert a composition in mole percentages into a base glass composition via the respective inverse matrix. Here, of course, only such base glass compositions are part of the present invention which, when converted, do not result in negative values for the base glasses.

With respect to the phases constituting the glass, the composition is selected within the limits described here. Of course, in the glass product the phases that constitute the glass are as such not present in crystalline form, but in amorphous form. But this does not mean that the constituent phases in the amorphous state are characterized by completely different assemblies compared to the crystalline state. As mentioned above, the topology of the assemblies is comparable, thus e.g. the coordination of the cations involved with surrounding oxygen atoms or the distance between the atoms which results from this coordination and the strength of the bond between these cations and surrounding oxygen atoms. Therefore, a lot of properties of the glass provided according to the present invention can be described very well on the basis of the constituent phases, particularly for illustrating the inventive effort and the problems which can be overcome with the present invention (for that, cf. Conradt R., loc. cit.). Here, of course, the glass cannot only be produced by using the respective crystals, but also—and may be even preferred—by using the common glass raw materials, as long as the stoichiometric ratios allow the formation of the respective assemblies of the base glasses.

The selection of the phases is conducted with respect to suitability for ion transport or a supporting influence onto the ion transport as well as their influence on hydrolytic resistance as well as thermal expansion. In the following, calculation methods are described with which these parameters can be calculated from a given composition of constituent phases. These calculation methods are significant for both, for the selection of the constituent phases and also for the composition of a glass provided according to the present invention that has these constituent phases.

When standards are mentioned in this description, then the version meant is the up-to-date standard with respect to the filing date of this patent application, unless otherwise stated.

Both, the hydrolytic resistance according to ISO 719/720 and also the alkali resistance according to ISO 695 basically comprise a resistance of the glass against the attack of hydroxyl ions. Here, in the case of ISO 695 the concentration of the hydroxyl ions in the base is determined by the fact that a buffer solution with 0.5 mole/l of sodium hydroxide and 0.25 mole/l of sodium carbonate is used. In the case of ISO 719/720 the glass is placed in neutral water, wherein the pH value thereof is at first adjusted to 5.5 (verified by a methyl red indicator solution), but by the dissolution of the glass the pH value shifts into the alkaline range very quickly. A buffer solution of the weak acids (and/or acid anhydrides), above all silicic acid, and the strong bases (such as sodium hydroxide) which are contained in the glass, wherein the pH value thereof is in the range of 9 to 10, results, see Susanne Fagerlund, Paul Ek, Mikko Hupa and Leena Hupa: On determining chemical durability of glasses, Glass Technol.: Eur. J. Glass Sci. Technol. A, December 2010, 51 (6), 235-240. The pKa values of the weak acid(s) are essential for the pH value of a buffer solution. The concentration of the hydroxyl ions is determined by the pH value of the accruing buffer solution which, on the one hand, depends on the type of the glass and, on the other hand, increases during the course of the dissolution process. Then, the dissolution which is effected by these hydroxyl ions takes place according to the same mechanism like in the case of the measurement of the alkali resistance.

Thus, for reaching both, making a glass resistant against bases and also hydrolytically resistant, it is at first necessary to achieve that the removal rate during the test according to ISO 695 has a low value. On the other hand, the pH value which results during a test according to ISO 719/720 and the thereby occurring dissolution of a certain amount of glass in the aqueous test solution has to be limited. A higher pH value during the course of the test results in a higher risk of a positive feedback effect: with an increasing pH value also the removal rate increases, with an increasing amount of removal material in the aqueous solution in turn the pH value thereof increases, etc.

During the test, chemically stable glasses (hydrolytic class HGB I according to ISO 719 or hydrolytic class HGA I according to ISO 720) typically are subject to a removal which results in up to 100 μmole of glass in the aqueous solution, wherein generally a lower removal results in a less congruent removal.

Since a comparison of glasses has to refer to fixed conditions, the significant pH value is defined as that pH value which results in neutral water after a congruently supposed dissolution of 50 μmole of glass. The present invention provides glasses for which this pH value is, rounded down to the second figure after the decimal, at most 9.16, such as at most 9.15, at most 9.14, at most 9.13, at most 9.12, at most 9.11, or at most 9.10.

According to the present invention, the removal rate according to ISO 695 may be at most 112 mg/(dm$^2$3 h), such as at most 111 mg/(dm$^2$3 h), at most 110 mg/(dm$^2$3 h), at most 109 mg/(dm$^2$3 h), at most 108 mg/(dm$^2$3 h), at most 107 mg/(dm$^2$3 h), at most 106 mg/(dm$^2$3 h), at most 105 mg/(dm$^2$3 h), or at most 104 mg/(dm$^2$3 h). Here the removal rate which can be calculated with the help of the formulas (2) and (3) for glasses provided according to the present invention is meant.

The first aforementioned value is below (in an extent of more than a half of the class width) the limit between the base classes 2 and 3 according to ISO 695. With intent such a high distance is chosen so that also in the case of optional tolerances of the prediction accuracy of the formulas (2) and (3) there is a large safety distance to class 3.

With respect to the removal rate in acid according to DIN12116 it can be said that it in the case of glasses with the above defined composition according to the present invention and with a characteristic number of <200 such as defined below corresponds to an acid class 3 or lower, and with a characteristic number of >215 corresponds to an acid class 3 or higher, inter alia, acid class 4, wherein the removal rate is partly several decimal powers above the limit between the classes 3 and 4. Between, there is a transition region. Glasses provided according to the present invention may have a characteristic number of <208, such as <207, <206, <205, <204, <203, <202, <201, or <200.

According to the present invention, the coefficient of thermal expansion may be between 6.5 and 10.5 ppm/K, such as between 7.5 and 10.5 ppm/K or between 8.5 and 10.5 ppm/K. Here the value CTE which can be calculated with the help of formula (8) for glasses provided according to the present invention is meant.

The calculation of the pH value in aqueous solution is based on the information regarding the composition of ordinary oxides. In the diluted solution of the glass constituents the respective cations convert into the hydroxides with the highest oxidation state. See table 5. The release of an H$^+$ or OH$^-$ of these hydroxides is described by a respective pKa or pKb value each.

Here, reference is made to the pH value which prevails after dissolution of 50 μmole in one liter of the aqueous solution after cooling to room temperature (25° C.).

TABLE 5

| # | Oxide or anhydride | Acid or hydroxide | | |
|---|---|---|---|---|
| 1. | $SiO_2$ | $H_4SiO_4$ | $H_4SiO_4 \rightarrow H_3SiO_4^- + H^+$ | pKa = 9.7[1]) |
| | | | $H_3SiO_4^- \rightarrow H_2SiO_4^{-2} + H^+$ | pKa = 11.9[1]) |
| 2. | $ZrO_2$ | $Zr(OH)_4$ | $Zr(OH)_4 + H_2O \rightarrow Zr(OH)_5^- + H^+$ | pKa = 5.99[2]) |
| | | | $Zr(OH)_3^+ + H_2O \rightarrow Zr(OH)_4 + H^+$ | pKa = 4.6[2]) |
| 3. | $B_2O_3$ | $H_3BO_3$ | $H_3BO_3 \rightarrow H_2BO_3^- + H^+$ | pKa = 9.23[2a]) |
| 4. | $Al_2O_3$ | $Al(OH)_3$ | $Al(OH)_3 + H_2O \rightarrow Al(OH)_4^- + H^+$ | pKa = 12.3[3]) |
| | | | $Al(OH)_2^+ + H_2O \rightarrow Al(OH)_3 + H^+$ | pKa = 5.7[3]) |
| 5. | ZnO | $Zn(OH)_2$ | $Zn^{+2} + H_2O \rightarrow ZnOH^+ + H^+$ | pKa = 9.05[4]) |
| | | | $ZnOH^+ + H_2O \rightarrow Zn(OH)_2 + H^+$ | pKa = 9.75[4]) |
| | | | $Zn(OH)_2 + H_2O \rightarrow Zn(OH)_3^- + H^+$ | pKa = 10.1[4]) |
| | | | $Zn(OH)_3^- + H_2O \rightarrow Zn(OH)_4^- + H^+$ | pKa = 10.05[4]) |
| 6. | MgO | $Mg(OH)_2$ | $Mg(OH)_2 \rightarrow Mg(OH)^+ + OH^-$ | pKb = −2[5]) |
| | | | $Mg(OH)^+ \rightarrow Mg^{++} + OH^-$ | pKb = 2.58[6]) |
| 7. | CaO | $Ca(OH)_2$ | $Ca(OH)_2 \rightarrow Ca(OH)^+ + OH^-$ | pKb = −2[5]) |
| | | | $Ca(OH)^+ \rightarrow Ca^{++} + OH^-$ | pKb = 1.3[7]) |

TABLE 5-continued

| # | Oxide or anhydride | Acid or hydroxide | | |
|---|---|---|---|---|
| 8. | $Na_2O$ | NaOH | $NaOH \rightarrow Na^+ + OH^-$ | $pKb = -0.77$[10]) |
| 9. | $K_2O$ | KOH | $KOH \rightarrow K^+ + OH^-$ | $pKb = -2$[11]) |

[1])Pure Appl. Chem., 1969, Vol. 20, No. 2, pp. 133-236, numeral 176; value of the source being called "G40" there.
[2])R.H. Byrne, Inorganic speciation of dissolved elements in seawater: the influence of pH on concentration ratios, Geochem. Trans. 3 (2) (2002) 11-16.
[2a])Pure Appl. Chem., 1969, Vol. 20, No. 2, pp. 133-236, numeral 149; value of the source being called "M11" there.
[3])David W. Hendricks, Water Treatment Unit Processes: Physical and Chemical, CRC Taylor and Francis, Boca Raton, London, New York, 2006, p. 307; values of the sources being called "4", "5", "11", "12" there.
[4])Artur Krezel, Wolfgang Maret, The biological inorganic chemistry of zinc ions, Archives of Biochemistry and Biophysics (2016), p. 1-17
[5])Like in the case of barium hydroxide, see Pure Appl. Chem., 1969, Vol. 20, No. 2, pp. 133-236, numeral 12, it is assumed that $M(OH)_2 \rightarrow M(OH)^+ + OH^-$ for all alkaline earths M in any case completely proceeds; for this first dissociation as pKb value the highest pKb value being present in this table is used, namely that one of potassium hydroxide solution.
[6])Pure Appl. Chem., 1969, Vol. 20, No. 2, pp. 133-236, numeral 115; value of the source being called "S74" there.
[7])Pure Appl. Chem., 1969, Vol. 20, No. 2, pp. 133-236, numeral 18; value of the source being called "D9" there.
[10])Pure Appl. Chem., 1969, Vol. 20, No. 2, pp. 133-236, numeral 178; value of the source being called "G26" there.
[11])Pure Appl. Chem., 1969, Vol. 20, No. 2, pp. 133-236, numeral 164; value of the source being called "K2" there.

The pH value, in the case of a given composition, can be obtained by solving the equation system for the different concentrations [ . . . ] (for pKa and pKb the above listed values have to be used):

Equation system (1)

$$[H_2SiO_4^{--}][H^+]/[H_3SiO_4^-]=10^{-pKa}, \qquad 1.$$

$$[H_3SiO_4^-][H^+]/[H_4SiO_4]=10^{-pKa}, \qquad 2.$$

$$[H_2SiO_4^{--}]+[H_3SiO_4^-]+[H_4SiO_4]=50 \ (\mu mole/l)* \ c_{SiO2}, \qquad 3.$$

$$[Zr(OH)_5^-][H^!]/[Zr(OH)_4]=10^{-pKa}, \qquad 4.$$

$$[Zr(OH)_4][H^+]/[Zr(OH)_3^+]=10^{-pKa}, \qquad 5.$$

$$[Zr(OH)_5^-]+[Zr(OH)_4]+[Zr(OH)_3^+]=50 \ (\mu mole/l)* \ c_{SiO2}, \qquad 6.$$

$$[H_2BO_3^-][H^{3O}]/[H_3BO_3]=10^{-pKa}, \qquad 7.$$

$$[H_2BO_3^-]+[H_3BO_3]=50 \ (\mu mole/l)*2*c_{B2O3}, \qquad 8.$$

$$[Al(OH)_4^-][H^+]/[Al(OH)_3]=10^{-pka}, [Al(OH)_3][H^+]/[Al(OH)_2^+]=10^{-pKa}, \qquad 9.$$

$$[Al(OH)_4^-]+[Al(OH)_3]+[Al(OH)_2^-]=50 \ (\mu mole/l)* \ 2*c_{Al2O3}, \qquad 10.$$

$$[ZnOH^+][H^+]/[Zn^{++}]=10^{-pKa}, \qquad 11.$$

$$[Zn(OH)_2][H^+]/[ZnOH^-]=10^{-pKa}, \qquad 12.$$

$$[Zn(OH)_3^-][H^-]/[Zn(OH)_2]=10^{-pKa}, \qquad 13.$$

$$[Zn(OH)_4^{--}][H^-]/[Zn(OH)_3^-]=10^{-pKa}, \qquad 14.$$

$$[ZnOH^+]+[Zn^{++}]+[Zn(OH)_2]+[Zn(OH)_3^-]+ \ [Zn(OH)_4^{--}]=50 \ (\mu mole/l)*c_{ZnO}, \qquad 15.$$

$$[MgOH^+][OH^-]/[Mg(OH)_2]=10^{-pKb}, [Mg^{++}][OH^-]/ \ [MgOH^+]=10^{-pKb}, \qquad 16.$$

$$[MgOH^+]+[Mg(OH)_2]+[Mg^{++}]=50 \ (\mu mole/l)*c_{MgO}, \qquad 17.$$

$$[CaOH^+][OH^-]/[Ca(OH)_2]=10^{-pKb}, [Ca^{++}][OH^-]/ \ [CaOH^+]=10^{-pKb}, \qquad 18.$$

$$[CaOH^+]+[Ca(OH)_2]+[Ca^{++}]=50 \ (\mu mole/l)*c_{CaO}, \qquad 19.$$

$$[Na^+][OH^-]/[NaOH]=10^{-pKb}, \qquad 20.$$

$$[Na^+]+[NaOH]=50 \ (\mu mole/l)*2*c_{Na2O}, \qquad 21.$$

$$[K^+][OH^-]/[KOH]=10^{-pKb}, \qquad 22.$$

$$[K^+]+[KOH]=50 \ (\mu mole/l)*2*c_{K2O}, \qquad 23.$$

$$[OH^-][H^+]=10^{-14}, \qquad 24.$$

$$2*[H_2SiO_4^{--}]+[H_3SiO_4^-]+[Zr(OH)_5^-]+[Al(OH)_4^-]+ \ 2*[Zn(OH)_4^{--}]+[Zn(OH)_3^-]+[OH^-]= \ [Zr(OH)_3^-]+[Al(OH)_2^+]+2*[Zn++]+[ZnOH+]+ \ 2*[Ba^{++}]+[BaOH^+]+2*[Ca^{++}]+[CaOH^+]+2* \ [Mg^{++}]+[MgOH^+]+[Na^+]+[K^+]+[H+] \qquad 25.$$

The equations 1-24 are equilibrium conditions, and equation 25 is the condition of electroneutrality.

The equation system can uniquely be solved with one of the common mathematical codes such as e.g. MATHEMATICA of Wolfram Research Inc. MATHEMATICA provides a list of solutions, wherein however only one of them fulfills the required supplementary condition that all concentrations have to be positive.

According to the definition, the pH value is the negative decadic logarithm of $[H^+]$. Also, at room temperature the following is true: $pKa+pKb=14$.

Here, exemplary embodiments provided according to the present invention are based on the surprisingly found relationship between a parameter construed with the help of topological considerations and the removal rate being measured in the test according to ISO 695.

The base of topological considerations is to count the constraints which are imposed on the atoms by the bond to the neighbor atoms—such as for example explained in detail in DE 10 2014 119 594 A1. These constraints relate, on the one hand, to the interatomic distance ("distance conditions") and, on the other hand, to the bond angles ("angle conditions"). When an atom has r neighbors (r=coordination number), then from the r distance conditions to these neighbors r/2 distance conditions to be assigned to this atom follow, when the distance conditions are equally distributed among both binding partners. From the bond angles between these neighbors, with the considered atom at the tip of the respective angle, further 2r-3 angle conditions follow which have to be assigned to this atom.

In DE 10 2014 119 594 A1 a method is described in which in the calculation of the distance and angle conditions a weighting of all conditions with the single bond strength and once again an additional weighting of the angle conditions (only those arising from the oxygen/cation/oxygen angles; the conditions arising from the cation/oxygen/cation angles are disregarded) with the covalence number of the respective bond are involved. Here, the weighting factors are normalized by respectively dividing by the single bond strength or the covalence number of the silicon-oxygen bond so that for quartz glass a number of (rounded) 1.333333333 (i.e. 4/3) distance conditions and (rounded) 1.666666667 (i.e. 5/3) angle conditions per atom result. This corresponds, such as explained in DE 10 2014 119 594 A1, to the direct analysis of the topology of quartz glass, when all distance and angle conditions are counted once and the angle conditions of the silicon/oxygen/silicon angles are disregarded.

Thus, quartz glass is characterized by a number of "3" constraints per atom which exactly corresponds to the number of freedom degrees per atom. Thus, quartz glass should not have any (or in reality: a very low) number of freedom degrees per atom which corresponds to the small $c_p$ transition of quartz glass, when the glass transition is measured by differential scanning calorimetry, see R. Brüning, "On the glass transition in vitreous silica by differential thermal analysis measurements", Journal of Non-Crystalline Solids 330 (2003) 13-22.

Generally, for other oxidic glasses lower values for the numbers of the distance and angle conditions per atom than (rounded) 1.333333333 (4/3) and 1.666666667 (5/3) result. Correspondingly, the differences are the numbers of the freedom degrees of distances and angles per atom. In the case of the degrees of angular freedom it is possible to distinguish between angle conditions relating to angles which all are in one plane (trigonal coordination) or not (tetrahedral or higher coordination). Here, the latter are referred to as 3D angle conditions; correspondingly, the difference to (rounded) 1.666666667 (4/3) as 3D degrees of angular freedom.

Surprisingly, it was found that there is a relationship between the number of the 3D degrees of angular freedom per atom and the removal rate r in the ISO 695 test with which the classes of the alkali resistance of a glass can be assessed. This relationship which is especially optimized for use also in the case of glasses with high alkali content and which has shown good results in numerous tests of glasses is as follows:

$$r = c \cdot \left( \frac{M}{M_{SiO_2}} \cdot \frac{N}{N_{SiO_2}} \right) \cdot ((1+f)^6 + c') \cdot (0.9483333 - \Lambda) \tag{2}$$

"c" is a constant with the dimension mg/(dm²3 h); the numerical value is 163.9. "f" is the number of the 3D degrees of angular freedom per atom. "c" is a constant without dimension with a value of 1.8. The exponent "6" was found empirically. A is the optical basicity.

The factor $N/N_{SiO_2}$ is used for the conversion of one atom group for which the above probability consideration has been made into one mole. N is the number of the atoms per mole. $N_{SiO_2}$ is the number of the atoms per mole quartz glass (namely $3N_A$, $N_A$ Avogadro number) and is used for the normalization of this term. Without significant error, it is possible to use this factor as a constant and to combine this constant with the prefactor "c", when this is only made within a clearly defined glass family. The factor $M/M_{SiO_2}$ is used for the conversion of the above consideration of one atom into a mass consideration. M is the mass of one mole. $M_{SiO_2}$ is the mass of one mole quartz glass (namely 60.08 g) and is used for the normalization of this term. It is also possible, without significant error, to use this factor as a constant and to combine this constant with the prefactor "c", when this is only made within a clearly defined glass family.

As already mentioned, the relationship between the removal rate and numbers of the 3D degrees of angular freedom was found empirically, but it seems plausible, when it is considered that the kinetics of the penetration of OH⁻ ions into the glass depends on the entropy of the glass. It is not assumed that the factor (0.9483333-A) is linked with the kinetic of the process, but with the driving force of the acid/base reaction which occurs in the context of the dissolution of the glass in the solution.

Since the glasses provided according to the present invention comprise a combination of the constituent phases mentioned above it is appropriate for the calculation of the number of the 3D degrees of angular freedom per atom at first to specify it numerically for each constituent phase. The following is true:

TABLE 6

| Constituent phase | Stoichiometry | Mole mass/g | Number of atoms per assembly | Number of the 3D degrees of angular freedom per atom |
|---|---|---|---|---|
| reedmergnerite | $(Na_2O \bullet B_2O_3 \bullet 6SiO_2)/8$ | 61.5129 | 26/8 | 0.235470229 |
| albite | $(Na_2O \bullet Al_2O_3 \bullet 6SiO_2)/8$ | 65.5558 | 26/8 | 0.318898019 |
| orthoclase | $(K_2O \bullet Al_2O_3 \bullet 6SiO_2)/8$ | 69.5829 | 26/8 | 0.322595955 |
| natrosilite | $(Na_2O \bullet 2SiO_2)/3$ | 60.7158 | 3 | 0.534707676 |
| sodium metasilicate | $(Na_2O \bullet SiO_2)/2$ | 61.03162 | 3 | 0.800291411 |
| parakeldyshite | $(Na_2O \bullet ZrO_2 \bullet 2SiO_2)/4$ | 76.3416 | 12/4 | 0.5871628 |
| narsarsukite | $(Na_2O \bullet TiO_2 \bullet 4SiO_2)/6$ | 63.7025 | 18/6 | 0.379385407 |
| reedmergnerite | $(Na_2O \bullet B_2O_3 \bullet 6SiO_2)/8$ | 61.5129 | 26/8 | 0.235470229 |
| disodium zinc silicate | $(Na_2O \bullet ZnO \bullet 3SiO_2)/5$ | 64.7222 | 14/5 | 0.52778666 |
| cordierite | $(2MgO \bullet 2Al_2O_3 \bullet 5SiO_2)/9$ | 64.9948 | 29/9 | 0.427525472 |
| danburite | $(CaO \bullet B_2O_3 \bullet 2SiO_2)/4$ | 61.466 | 13/4 | 0.325810349 |

The numerical values were calculated according to the method given in DE 10 2014 119 594 A1, wherein here the number of the degrees of angular freedom for all cations was calculated, namely like in DE 10 2014 119 594 A1 (but there only for boron and aluminum); in addition, the degree of ionization of a cation-oxygen compound was not calculated according to formula (8) of DE 10 2014 119 594 A1, but according to formula (3) of Alberto Garcia, Marvon Cohen, First Principles Ionicity Scales, Phys. Rev. B 1993. For that further information about the coordination number of the respective cation is required, wherein here according to Conradt, loc.cit., the coordination number of the respective constituent phase is used (when a cation is present in several coordination numbers, then a mean value of the different coordination numbers which corresponds to the respective proportions is used). The mentioned coordination numbers can be found in literature, for reedmergnerite: D. Appleman, J. R. Clark, Crystal Structure of Reedmergnerite, The American Mineralogist Vol 50, November/December, 1965, wherein in view of this source for Si and B a coordination number of 4 and for Na a coordination number of 5 were assumed; for albite: American Mineralogist, Volume 61, pages 1213-1225, 1976, American Mineralogist, Volume 62, pages 921-931, 1977, American Mineralogist, Volume 64, pages 409-423, 1979, American Mineralogist, Volume 81, pages 1344-1349, 1996, wherein in view of these sources for Si and Al a coordination number of 4 and for Na a coordination number of 5 were assumed; for orthoclase: Canadian Mineralogist, Volume 17, pages 515-525, 1979, wherein in view of this source for aluminum a coordination number of 4, for potassium a coordination number of 9 and for silicon a coordination number of 4 were assumed; for natrosilite: Jantzen, Williams, WM2008 Conference Phoenix Arizona: "natrosilite hydrate which is calcined at 600-800° C. results in delta-natrosilite, wherein the latter comprises an Na with a coordination number of 5 and an Na with a coordination number of 6", see also D. Heidemann, C. Hilbert, W. Schwieger, P. Grabner, K.-H. Bergk, P. Sari, 29Si- and 23Na-Festkörper-MAS-NMR-Untersuchungen an Modifikationen des $Na_2Si_2O_5$, Z. anorg. allg. Chem. 617 (1992) 169-177; for sodium metasilicate: J. Phys. Chem. B 2001, 105, 12257-12265, wherein in view of this source for silicon a coordination number of 4 and for sodium a coordination number of 5 were assumed; for parakeldyshite: Acta Chemica Scandinavia, 1997, 51, 259-263, wherein in view of this source for silicon a coordination number of 4, for zirconium a coordination of 6 and for sodium a coordination number of 8 were assumed; for narsarsukite: American Mineralogist 47 (1962), 539, wherein in view of this source for silicon a coordination number of 4, for titanium a coordination number of 6 and for sodium a coordination number of 7 were assumed; disodium zinc silicate: Acta Cryst. (1977), B33, 1333-1337, wherein in view of this source for silicon and zinc a coordination number of 4 and for sodium a coordination number of 7 were assumed; for cordierite: American Mineralogist, Volume 77, pages 407-411, 1992, wherein in view of this source for silicon and aluminum a coordination number of 4 and for magnesium a coordination number of 6 were assumed; for danburite: American Mineralogist, Volume 59, pages 79-85, 1974, wherein in view of this source for silicon and boron a coordination number of 4 and for calcium a coordination number of 7 were assumed.

Thus, the calculation specification for the determination of the 3D degrees of angular freedom f per atom in the final glass is as follows:

$$f = \frac{\sum_{i=1}^{n} c_i \cdot z_i \cdot f_i}{\sum_{i=1}^{n} c_i \cdot z_i}, \tag{3}$$

wherein $c_i$ is the molar proportion of the ith constituent phase in the considered glass composition, $z_i$ is the number of atoms per assembly in the ith constituent phase (or the number of atoms per mole in the ith constituent phase; then in units of $N_A$, $N_A$ Avogadro number) and $f_i$ is the number of the degrees of angular freedom per atom in the ith constituent phase. "n" is the number of the constituent phases.

The calculation specification for the determination of $M/M_{SiO2}$ is as follows:

$$\frac{M}{M_{SiO_2}} = \frac{\sum_{i=1}^{n} c_i \cdot M_i}{M_{SiO_2} \cdot \sum_{i=1}^{n} c_i}, \tag{4}$$

wherein $c_i$ is the molar proportion of the ith constituent phase in the considered glass composition and $M_i$ is the respective molar mass, "n" is the number of the constituent phases.

The calculation specification for the determination of $N/N_{SiO2}$ is as follows:

$$\frac{N}{N_{SiO_2}} = \frac{\sum_{i=1}^{n} c_i \cdot z_i}{3 \cdot \sum_{i=1}^{n} c_i}, \tag{5}$$

wherein $c_i$ is the molar proportion of the ith constituent phase in the considered glass composition and $z_i$ is the number of atoms per assembly in the ith constituent phase (or the number of atoms per mole in the ith constituent phase; then in units of $N_A$, $N_A$ Avogadro number), "n" is the number of the constituent phases.

The following consideration results in the finding that there is a relationship between the factor (0.9483333-A) and the driving force of the dissolution. This driving force is higher, when the glass is more "acidic", i.e. when the proportion of acid anhydrides is higher and when the proportion of alkali anhydrides is lower. A quantitative measure for that is the optical basicity, see C. P. Rodriguez, J. S. McCloy, M. J. Schweiger, J. V. Crum, A, Winschell, Optical Basicity and Nepheline Crystallization in High Alumina Glasses, Pacific Northwest National Laboratories, PNNL 20184, EMSP-RPT 003, prepared for the US Department of Energy under contract DE-AC05-76RL01830. When the optical basicity is lower, then the driving force is higher. The fact that the "driving force is zero" is true for a material in which the acid/base reaction is completed. The latter case is in particular assumed, when the glass has the stoichiometry of sodium metasilicate, thus that one under all sodium silicates which are solids having the highest proportion of sodium. (Sodium orthosilicate only appears in aqueous solution). Its optical basicity according to the method for the calculation of it described below is exactly 0.9483333, thus the value with which per constructionem the aforementioned factor (0.9483333-A) becomes zero.

The optical basicity A is calculated according to formula B.1 with the coefficient $\Lambda_{\chi_{av}}$ (optical basicity according to Li and Xue) according to paragraph B.1.6 and table B.1 of C. P. Rodriguez, J. S. McCloy, M. J. Schweiger, J. V. Crum, A, Winschell, Optical Basicity and Nepheline Crystallization in High Alumina Glasses, Pacific Northwest National Laboratories, PNNL 20184, EMSP-RPT 003, prepared for the US Department of Energy under contract DE-AC05-76RL01830. When in the table for an ordinary oxide only one coefficient is given, then this coefficient is used. When in the table for one ordinary oxide several coefficients are given, then the coefficient which applies to the coordination numbers of the respective cation in the constituent phases is used. For the above described base system this is only necessary in the case of aluminum oxide and magnesium oxide. Since aluminum has a coordination number of 4 in all constituent phases of the base system and since according to Conradt, loc. cit., it is also assumed that, for the coefficient $\Lambda_{ICP}$ the value which is given in table B.1 in the case of aluminum oxide for the coordination number of 4 is used. Since magnesium in the only magnesium containing constituent phase of the base system has a coordination number of 6, for the coefficient $\Lambda_{\chi_{av}}$ the value which is given in table B.1 in the case of magnesium oxide for the coordination number of 6 is used.

Surprisingly, it is also possible to assess the acid resistance with the help of a characteristic number which can easily be calculated. The starting point for the basic considerations associated therewith is the theory of Anderson and Stuart about the ion mobility in siliceous glasses, see O. L. Anderson, D. A. Stuart, Calculation of Activation Energy of Ionic Conductivity in Silica Glasses by Classical Methods, Journal of the American Ceramic Society, Vol. 37, No. 12 (1954), 573-580. According to that the activation energy of the movement of a cation in a siliceous and thus oxidic glass depends, on the one hand, on the electrostatic interaction with the surrounding oxygen atoms which has to be overcome and, on the other hand, on the mechanical resistance which has to be overcome, when they relocate from one mesh of the siliceous network into the next. The first mentioned contribution according to Coulomb's law is proportional to the charge number of the considered cation and inversely proportional to the dielectric constant, the second mentioned contribution is proportional to the shear modulus and to the power of two of the value of the measure which corresponds to the difference between the diameter of the considered cation and the mesh width of the network. Due to the first mentioned contribution inter alia only singly charged cations are mobile and multiply charged cations such as aluminum are stationary.

In contact with a highly concentrated acid, according to ISO 1776 and DIN 12116 this is 6N hydrochloric acid, this is different. In this case protons or hydronium ions diffuse into the glass and form at the surface with the chloride ions which remain an electric double layer in the acid bath. An analysis of the eluate comprising measurements according to ISO 1776 has shown that this electric double layer is formed in such an extent that the electric field originating from that is capable of compensating the electrostatic interaction of the respective cation with the surrounding oxygen ions so that also ions with high charge number become mobile. (The force action of the electric field of the mentioned double layer, just as the electrostatic interaction of the considered cation, depends on its charge number; therefore, the first one may be capable of compensating the last one).

This may result in the fact that under the same test conditions (those of ISO 1776) much more aluminum ions leave an alkali-free display glass than sodium ions a soda-lime glass. On the other hand, in turn under the same test conditions less boron atoms leave a borosilicate glass than aluminum atoms an aluminosilicate glass. This can be understood, when the following is considered: due to the different values of electronegativity boron or also silicon show a considerably lower tendency to react with hydrochloric acid than aluminum or sodium. The reaction of sodium oxide with hydrochloric acid is a reaction of a strong base (or a strong base anhydride) with a strong acid, aluminum as an amphoteric compound is in the middle and boron oxide or silicon oxide are anhydrides of weak acids.

The tendency of a cation to leave the glass composite can be deduced from the degree of ionization of the respective cation-oxygen compound which can be calculated according to the formula (3) of Alberto Garcia, Marvon Cohen, First Principles Ionicity Scales, Phys. Rev. B 1993.

For that further information about the coordination number of the respective cation is required, wherein according to Conradt, loc.cit., the coordination number of the respective constituent phase is used (when a cation is present in several coordination numbers, then a mean value of the different coordination numbers which corresponds to the respective proportions is used). The mentioned coordination numbers can be found in literature, for reedmergnerite: D. Appleman, J. R. Clark, Crystal Structure of Reedmergnerite, The American Mineralogist Vol 50, November/December, 1965, wherein in view of this source for Si and B a coordination number of 4 and for Na a coordination number of 5 were assumed; for albite: American Mineralogist, Volume 61, pages 1213-1225, 1976, American Mineralogist, Volume 62, pages 921-931, 1977, American Mineralogist, Volume 64, pages 409-423, 1979, American Mineralogist, Volume 81, pages 1344-1349, 1996, wherein in view of these sources for Si and Al a coordination number of 4 and for Na a coordination number of 5 were assumed; for orthoclase: Canadian Mineralogist, Volume 17, pages 515-525, 1979, wherein in view of this source for aluminum a coordination number of 4, for potassium a coordination number of 9 and for silicon a coordination number of 4 were assumed; for natrosilite: Jantzen, Williams, WM2008 Conference Phoenix Arizona: "natrosilite hydrate which is calcined at 600-800° C. results in delta-natrosilite, wherein the latter comprises an Na with a coordination number of 5 and an Na with a coordination number of 6", see also D. Heidemann, C. Hilbert, W. Schwieger, P. Grabner, K.-H. Bergk, P. Sari, 29Si- and 23Na-Festkörper-MAS-NMR-Untersuchungen an Modifikationen des $Na_2Si_2O_5$, Z. anorg. allg. Chem. 617 (1992) 169-177; for sodium metasilicate: J. Phys. Chem. B 2001, 105, 12257-12265, wherein in view of this source for silicon a coordination number of 4 and for sodium a coordination number of 5 were assumed; for parakeldyshite: Acta Chemica Scandinavia, 1997, 51, 259-263, wherein in view of this source for silicon a coordination number of 4, for zirconium a coordination of 6 and for sodium a coordination number of 8 were assumed; for narsarsukite: American Mineralogist 47 (1962), 539, wherein in view of this source for silicon a coordination number of 4, for titanium a coordination number of 6 and for sodium a coordination number of 7 were assumed; disodium zinc silicate: Acta Cryst. (1977), B33, 1333-1337, wherein in view of this source for silicon and zinc a coordination number of 4 and for sodium a coordination number of 7 were assumed; for cordierite: American Mineralogist, Volume 77, pages 407-411, 1992, wherein in view of this source for silicon and aluminum a coordination number of 4 and for magnesium a coordination number of 6 were assumed; for danburite: American Mineralogist, Volume 59, pages 79-85, 1974, wherein in view of this source for silicon and boron a coordination number of 4 and for calcium a coordination number of 7 were assumed.

When the degree of ionization of the compound (degree of ionization according to Pauling, calculated according to formula (3) of Alberto Garcia, Marvon Cohen, First Principles Ionicity Scales, Phys. Rev. B 1993, s.a.) is multiplied by the valence number or valency of the cation, then a characteristic number is obtained which describes the destruction of the network being caused by fact that the cation leaves the network. The valency of the cation is the number of the hydronium ions which are necessary due to electroneutrality reasons for substituting the cation. Each hydronium ion destroys one and a half oxygen bridges in the glass, which then in the case of an acidic attack results in the observed gel formation, see e.g. T. Geisler, A. Janssen, D. Scheiter, T. Stephan, J. Berndt, A. Putnis, Aqueous corrosion of borosilicate glass under acidic conditions: A new corrosion mechanism, Journal of Non-Crystalline Solids 356 (2010) 1458-1465.

Multiplication of the respective characteristic number by the number of moles of the considered cation in one mole of glass and summation over all cations results in a characteristic number for the extent of the destruction of the network which is initially caused by an acidic attack onto the glass (hereafter: "characteristic acid number"). So, in particular, characteristic acid numbers for the glasses which are produced from one constituent phase each are obtained. When the partition of the glass with respect to the constituent phases is known, then the proportion of the constituent phase each given in mole percentages is multiplied by the last mentioned characteristic acid number, and subsequently a summation over all constituent phases is made.

Remarkably, a clear correlation with the acid classes according to DIN 12116 is found; wherein in the range of characteristic acid numbers of 200-215 the acid class strongly increases. Accordingly, a characteristic acid number of <200 is desirable.

In the following, for the constituent phases of the base glass system provided according to the present invention the characteristic acid numbers $k_i$ are tabulated so that the characteristic acid number of a glass provided according to the present invention can be calculated with the help of the following formula:

$$k = \frac{\sum_{i=1}^{n} c_i \cdot k_i}{\sum_{i=1}^{n} c_i}, \tag{6}$$

Here, n is the number of the constituent phases, $c_i$ is the respective molar proportion (mole percentage/100).

TABLE 7

| | | |
|---|---|---|
| reedmergnerite | $(Na_2O \cdot B_2O_3 \cdot 6SiO_2)/8$ | 198.6881341 |
| albite | $(Na_2O \cdot Al_2O_3 \cdot 6SiO_2)/8$ | 208.797171 |
| orthoclase | $(K_2O \cdot Al_2O_3 \cdot 6SiO_2)/8$ | 209.2704145 |
| natrosilite | $(Na_2O \cdot 2SiO_2)/3$ | 183.4107538 |
| sodium metasilicate | $(Na_2O \cdot SiO_2)/2$ | 185.3155396 |
| parakeldyshite | $(Na_2O \cdot ZrO_2 \cdot 2SiO_2)/4$ | 220.9573858 |
| narsarsukite | $(Na_2O \cdot TiO_2 \cdot 4SiO_2)/6$ | 200.2637459 |
| disodium zinc silicate | $(Na_2O \cdot ZnO \cdot 3SiO_2)/5$ | 176.7133128 |

TABLE 7-continued

| | | |
|---|---|---|
| cordierite | $(2MgO \cdot 2Al_2O_3 \cdot 5SiO_2)/9$ | 229.1163552 |
| danburite | $(CaO \cdot B_2O_3 \cdot 2SiO_2)/4$ | 217.3103529 |

Surprisingly, it is also possible to describe the position of the coefficient of thermal expansion within the intended range with the help of a very simple calculation specification. It results from the mean bond strength.

From literature is known that the coefficient of thermal expansion e.g. for metals is inversely proportional to the binding energy (or to the "depth of the interatomic potential wells"), see e.g. H. Föll, lecture script "Einführung in die Materialwissenschaft I", Christian Albrechts-Universität Kiel, p. 79-83.

In a simple picture of oxidic glasses the cations are placed in one potential well each being formed by the surrounding oxygen atoms, and for its depth the sum of the bond strengths of the different single bonds to the surrounding oxygen atoms is assumed, thus the whole interaction energy is concentrated in potential wells with the cations in the center and the oxygen atoms in the periphery. So it is not necessary to consider the reverse case; and it would also be more difficult to analyze it, because it is possible that an oxygen atom is located between several different cations, which reversely cannot occur in the case of purely oxidic glasses. These values are tabulated e.g. in DE 10 2014 119 594 A1:

TABLE 8

| Cation | Depth of potential well/ (kJ/mole) |
|---|---|
| Si | 1864 |
| Ti | 1913 |
| Zr | 2204 |
| B | 1572.5 |
| Al | 1537 |
| Zn | 728 |
| Mg | 999 |
| Ca | 1063 |
| Na | 440.5 |
| K | 395 |

The values for Ti, Zr, Sr, Ba and Zn do not originate from DE 10 2014 119 594 A1, but they have been calculated according to exactly the same method described there and with the help of the sources cited there.

From the composition of a glass out of the above mentioned constituent phases, the number of different cations contained in the respective phases and the depths of potential wells tabulated above per cation a mean depth of a potential well can be calculated:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \tag{7}$$

Here, m is the number of the present types of cations, $E_{pot,j}$ is the depth of a potential well tabulated above for the jth type of cation and $z_{j,i}$ is the number of the cations of the jth type in the ith constituent phase. In the following, the sums over j are tabulated:

TABLE 9

| Constituent phase | Formula (normalized to an ordinary oxide) | $\sum_{j=1}^{m} z_{i,j}$ | $\Sigma_{j=1}^{m} z_{i,j} \cdot E_{pot,j}/(kJ/mole)$ |
|---|---|---|---|
| reedmergnerite | $(K_2O \cdot B_2O_3 \cdot 6SiO_2)/8$ | 1.25 | 1901.25 |
| albite | $(Na_2O \cdot Al_2O_3 \cdot 6SiO_2)/8$ | 1.25 | 1892.375 |
| orthoclase | $(K_2O \cdot Al_2O_3 \cdot 6SiO_2)/8$ | 1.25 | 1881 |
| natrosilite | $(Na_2O \cdot 2SiO_2)/3$ | 1.33 | 1536.33 |
| sodium metasilicate | $(Na_2O \cdot SiO_2)/2$ | 1.5 | 1372.5 |
| parakeldyshite | $(Na_2O \cdot ZrO_2 \cdot 2SiO_2)/4$ | 1.25 | 1703 |
| narsarsukite | $(Na_2O \cdot TiO_2 \cdot 4SiO_2)/6$ | 1.16667 | 1708.333333 |
| disodium zinc silicate | $(Na_2O \cdot ZnO \cdot 3SiO_2)/5$ | 1.2 | 1440.2 |
| cordierite | $(2MgO \cdot 2Al_2O_3 \cdot 5SiO_2)/9$ | 1.222 | 1940.666667 |
| danburite | $(CaO \cdot B_2O_3 \cdot 2SiO_2)/4$ | 1.25 | 1984 |

This mean bond strength, such as e.g. also in the case of metals, see H. Föll, loc. cit., is inversely proportional to the coefficient of thermal expansion. The analysis of a number of relevant glasses results in the following formula:

$$CTE = \left( \frac{50082.42827 \left( \frac{kj}{mole} \right)}{E_{pot}} - -26.14910156 \right) ppm/K, \quad (8)$$

Since the bond strength is inversely proportional to the melting point, an inverse proportionality also applies between the melting point and the expansion coefficient, see in turn H. Föll, loc. cit. Since in the case of non-stoichiometric glasses there is no exact definition of the melting point, between the temperature which is generally called melting point and at which the viscosity is 100 dPas and the expansion coefficient only a tendency exists. But according to this tendency it is guaranteed that the glasses provided according to the present invention are meltable.

While the requirement of good meltability suggests a coefficient of thermal expansion which is as high as possible, contrary thereto, the requirement of thermal strains which are as low as possible during an optional thermal reprocessing suggests a coefficient of thermal expansion which is as low as possible. The combination of both requirements results in the here exemplary medium range for the coefficient of thermal expansion and/or the mean depth of a potential well.

According to the present invention, the coefficient of thermal expansion may be between 6.5 and 10.5 ppm/K, such as between 7.5 and 10.5 ppm/K or between 8.5 and 10.5 ppm/K. Here the value CTE is meant which can be calculated with the help of formula (8) for glasses provided according to the present invention.

For guaranteeing an optimum exchangeability, the content of $Na_2O$ of the glasses provided according to the present invention is in particular 8 mol % to 16 mol %, such as 12 mol % to 14 mol %. In other exemplary embodiments the content of $Na_2O$ of the glasses provided according to the present invention is 14 mol % to 16 mol %, in particular >14 mol % to 16 mol % or 14.5 mol % to 16 mol % or 15 mol % to 16 mol %. Here, the molar proportion of this oxide after converting the composition into the respective oxide composition is meant.

Furthermore, for guaranteeing a high exchangeability, due to the relationship to the coefficient of thermal expansion a high value thereof is intended, see Journal of Non-Crystalline Solids 455 (2017) 70-74. As can be followed from the aforementioned explanations with respect to the coefficient of thermal expansion, it is increased, in particular by the addition of alkali or alkaline earth ions. This results also in high alkali resistance, as can be followed from the aforementioned explanations with respect to the alkali resistance, due to the relationship to the driving force in the case of dissolving in alkaline medium. But this also results in an increase of the pH value which is determined according to the aforementioned regulations, which in turn decreases the hydrolytic resistance.

Therefore, the present invention relates to glasses for which the quotient of the coefficient of thermal expansion multiplied by 1000 (in ppm/K), on the one hand, and the product of the pH value and the calculated removal rate in alkaline environment (in mg/(dm$^2$3 h)) according to ISO 695, on the other hand, is at least 9.0, such as at least 9.1, at least 9.2, at least 9.3, at least 9.4, at least 9.5, at least 9.6, at least 9.7, at least 9.8, at least 9.9, or at least 10. The calculated values each for the coefficient of thermal expansion, the pH value and the removal rate according to ISO 695 are meant.

Albite

A base glass which is present in the glass provided according to the present invention as a constituent phase is albite glass. For ideal albite ($NaAlSi_3O_8$) is known that it is characterized by a high sodium diffusivity due to its structure of a skeleton of $SiO_4$ and A1O4 tetrahedrons with sodium ions being mobile within the skeleton, see Geochimica et Cosmochimica Acta, 1963, Vol. 27, pages 107-120. Therefore, a proportion of albite glass makes a contribution to a high sodium mobility which supports the ion exchange and thus the chemical temperability of the glasses. In contrast to nepheline which is characterized by a still higher sodium diffusivity (artificial variant without potassium: $NaAlSiO_4$) albite has the advantage of a considerably lower melting point (1100-1120° C.) which improves the meltability of the glass.

An amount of albite which is too low compromises the ion exchangeability and the chemical temperability with respect to the exchange of sodium with potassium. Pure albite glass would probably be able to provide an optimum chemical temperability, but with respect to the required chemical resistance, especially the acid resistance, it would not be expedient. According to the present invention, one mole of albite means one mole of $(Na_2O \cdot Al_2O_3 \cdot 6SiO_2)/8$.

The proportion of albite in the glass provided according to the present invention is at least 20 mol % and at most 60 mol %. Exemplary proportions in the glass provided according to the present invention are at least 30 mol % or at least 40 mol %. In some embodiments, the content of albite is at most 55 mol % or up to 50 mol %.

All components as hydroxides influence the pH value during the measurement of the hydrolytic resistance. In neutral aqueous solution and weak bases aluminum hydroxide shows poor solubility, but the solubility limit is considerably higher than the concentrations which occur during the measurements of the hydrolytic resistance.

Reedmergnerite

The boron analog of albite, reedmergnerite (here, the ideal composition $NaBSi_3O_8$ is meant), is characterized by a considerably lower number of degrees of angular freedom per atom than albite, namely 0.235470229. Therefore, the glass provided according to the present invention may contain reedmergnerite glass as a further base glass. Analogously to albite glass this base glass has a structure of $SiO_4$ and $BO_4$ tetrahedrons, but according to the higher bond strength of the B—O bond in comparison to the Al—O bond with a closer-meshed structure. In addition, the B—O bond is more covalent than the Al—O bond. Both results in the fact that the sodium atoms which are mobile in the skeleton according to Anderson and Stuart (Journal of the American Ceramic Society, Vol. 37, No. 12, 573-580) have a higher thermal activation enthalpy than in albite glass so that the contribution to the mobility of sodium ions at the same temperature in reedmergnerite glass is lower than in albite glass. According to the present invention, one mole of reedmergnerite means one mole of $(Na_2O \cdot B_2O_3 \cdot 6SiO_2)/8$.

The proportion of reedmergnerite in the glass provided according to the present invention is 0 mol % to at most 60 mol %. In some embodiments, the proportion of reedmergnerite in the glass provided according to the present invention is at most 50 mol %, such as at most 40 mol %, at most 30 mol %, at most 20 mol %, at most 10 mol %, at most 5 mol %, at most 2 mol %, or at most 1 mol %. In some embodiments the proportion of reedmergnerite is at least 0.1 mol %, such as at least 0.2 mol %. In some exemplary embodiments the glass is free of reedmergnerite. In particular, the content of reedmergnerite may be lower than the content of orthoclase and/or natrosilite.

All components as hydroxides influence the pH value during the measurement of the hydrolytic resistance.

Orthoclase

For suppressing a possible tendency to devitrification, the potassium analog of albite, orthoclase, is added as second phase. One mole of orthoclase means one mole of $(K_2O \cdot Al_2O_3 \cdot 6SiO_2)/8$.

The proportion of orthoclase in the glass provided according to the present invention is 0 mol % to at most 30 mol %. Exemplary proportions in the glass provided according to the present invention are at least 5 mol %, at least 10 mol % and/or at most 25 mol %, at most 20 mol % or up to 15 mol %. All components influence as hydroxides the pH value during the measurement of the hydrolytic resistance.

Natrosilite

As second phase with well sodium ion conductivity natrosilite is added which is a known ionic conductor, see M. L. F. Nascimento, E. Nascimento, W. M. Pontuschka, M. Matsuoka, S. Watanabe, Test of Anderson-Stuart model in sodium silicate glasses and the general Arrhenian conductivity rule in wide composition range, Cerâmica 52 (2006) 22-30. One mole of natrosilite means one mole of $(Na_2O \cdot 2SiO_2)/3$. The proportion of natrosilite in the glass provided according to the present invention is 0 to 20 mol %. Exemplary proportions in the glass provided according to the present invention are at least 2 mol %, at least 5 mol %, at least 10 mol %, at least 12 mol % and/or at most 19 mol %, at most 18 mol % or up to 15 mol %.

All components as hydroxides influence the pH value during the measurement of the hydrolytic resistance.

Sodium Metasilicate

As a further phase with well sodium ion conductivity which is used in the present invention sodium metasilicate is added which is a known ionic conductor, see The Electrical Conductivity of Sodium Metasilicate-Silica Glasses JSGT_V16_T450-T477. One mole of sodium metasilicate means one mole of $(Na_2O \cdot SiO_2)/2$. The proportion of sodium metasilicate in the glass provided according to the present invention is 0 to 20 mol %. Exemplary proportions in the glass provided according to the present invention are at least 0.5 mol %, at least 3 mol %, at least 5 mol %, at least 8 mol % and/or at most 18 mol %, at most 16 mol % or up to 15 mol %.

All components influence as hydroxides the pH value during the measurement of the hydrolytic resistance.

Parakeldyshite

As a further phase with sodium conductivity parakeldyshite is added. As crystal parakeldyshite is a three-dimensional network of silicon tetrahedrons and zirconium octahedrons with sodium atoms in the cavities therebetween with a coordination number of 8. This zeolite-like, uncongested (very high coordination number for sodium) structure supports the ion mobility. There is a structurally related potassium analog, khibinskite, so that also an exchange of sodium with potassium is possible. See G. Raabe, M. H. Mladeck, Parakeldyshit from Norway, Canadian Mineralogist Vol. 15, pp. 102-107 (1977).

This is an advantage for facilitating a rapid movement of the sodium and potassium ions during ion exchange. Due to the uncongested network the incorporation of compressive stress during the exchange of sodium with potassium is not very distinct; but for the above mentioned uses it is more important rather to achieve a high exchange depth (depth of layer) than a high compressive stress (the compressive stress only fulfils its purpose, when the exchange depth during ion exchange is higher than the depth of possible surface damages such as scratches).

The contained zirconium bears a meaning for the measurement of the hydrolytic resistance. Zirconium hydroxide precipitates in aqueous solution and weak bases, but only at a certain concentration (or higher concentrations) which is not achieved during measurements of hydrolytic resistance. Due to its pKa values at this concentration it may decrease the pH value.

One mole of parakeldyshite means one mole of $(Na_2O \cdot ZrO_2 \cdot 2SiO_2)/4$. The proportion of parakeldyshite in the glass provided according to the present invention is 0 to 20 mol %; the upper limit is chosen with respect to the problem of devitrification in connection with zirconium. In some embodiments, the proportion of parakeldyshite in the glass provided according to the present invention is at most 10 mol %, such as at most 5 mol %, or at most 3 mol %. In some embodiments the proportion of parakeldyshite is at least 0.1 mol %, such as at least 0.2 mol %, at least 0.5 mol %, at least 1 mol % or at least 1.5 mol %. In some embodiments the glass is free of parakeldyshite. In particular, the content of parakeldyshite may be lower than the content of orthoclase and/or natrosilite.

Narsarsukite

As crystal narsarsukite is a three-dimensional network of silicon tetrahedrons and titanium octahedrons with sodium atoms in the cavities therebetween with a coordination number of 7. This structure supports the ion mobility. See D. R. Peacor, M. J. Buerger, The Determination and Refinement of the Structure of Narsarsukite, $Na_2TiOSi_4O_{10}$, American Mineralogist Vol. 67, 5-6 pp. 539-556 (1962). There is a potassium analog, see Abraham, O. W. Flörke, and K. Krumbholz, Hydrothermaldarstellung und Kristalldaten von $K_2TiSi_3O_9$, $K_2TiSi_4O_{11}$, $K_2TiSi_6O_{15}$, $K_2ZrSi_3O_9$ und $K_2O·4SiO_2·H_2O$, Fortschr. Mineral 49 (1971), 5-7, so that also an exchange of sodium with potassium is possible.

The contained titanium precipitates in aqueous solution and bases as titanium oxide and does not influence the measurement of the hydrolytic resistance.

One mole of narsarsukite means one mole of $(Na_2O·TiO_2·4SiO_2)/6$. The content of narsarsukite in the glass provided according to the present invention is 0 to 20 mol %. Exemplary proportions in the glass provided according to the present invention are at most 10 mol %, at most 5 mol % or at most 3 mol %. In some embodiments the glass may be free of narsarsukite, wherein in particular the content of narsarsukite can be lower than the content of orthoclase and/or natrosilite.

Disodium Zinc Silicate

As crystal disodium zinc silicate is a three-dimensional network of silicon and zinc tetrahedrons with sodium atoms in the cavities therebetween with a coordination number of at least 7. This structure supports the ion mobility. See K.-F. Hesse, F. Liebau, H. Bohm, Disodiumzincosilicate, $Na_2ZnSi_3O_8$, Acta. Cryst. B33 (1977), 1333-1337. There is a potassium analog, see W. A. Dollase, C. R. Ross II, Crystal Structure, of $K_2ZnSi_3O_8$, Zeitschrift fur Kristallographie 206 (1993), 25-32, so that an exchange of sodium with potassium is easily possible, but the large cavities do not give reason to expect strong "swelling up" of the structure during ion exchange so that the proportion of disodium zinc silicate has to be limited, when a high compressive stress at the surface is desired.

The contained zinc as amphoteric zinc hydroxide only little influences the pH value during the measurement of the hydrolytic resistance. In neutral aqueous solution it shows poor solubility; but the solubility limit is considerably higher than the concentrations which appear during the measurements of the hydrolytic resistance.

One mole of disodium zinc silicate means one mole of $(Na_2O·ZnO·3SiO_2)/5$.

The content of disodium zinc silicate in the glass provided according to the present invention is 0 mol % to 20 mol %.

Exemplary proportions in the glass provided according to the present invention are at least 1 mol %, at least 1.4 mol %, at least 1.9 mol % or at least 2.5 mol %. In some embodiments the content is at most 19 mol %, at most 18 mol %, at most 17 mol % or at most 10 mol %. In some embodiments the glass may be free of disodium zinc silicate.

Cordierite, Danburite

All constituent phases mentioned up to now contain alkali. Due to the amount of alkali, alkali-containing glasses have high expansion coefficients (e.g. 8 to 10 ppm/K). For also allowing medium expansion coefficients phases are added, wherein their contribution either strongly decreases the expansion coefficient or shifts it to medium values.

With respect to alkali, hydrolytic and acid resistance these further phases have different behavior so that a mixture is desired. Furthermore, the alkaline earth aluminosilicates result in a decrease of the hydrolytic resistance. The alkaline earth compounds influence the pH value during the measurement of the hydrolytic resistance. The corresponding hydroxides show poor solubility in neutral aqueous solution and bases; but the solubility limit is considerably higher than the concentrations occurring during the measurements of the hydrolytic resistance.

One mole of cordierite means one mole of $(2MgO·2Al_2O_3·5SiO_2)/9$. The proportion of cordierite in the glasses provided according to the present invention is 0 to 21 mol %. Exemplary proportions in the glass provided according to the present invention are up to 20 mol % or up to 19 mol %. In some embodiments, the content of cordierite is at least 3 mol %, at least 6 mol %, at least 10 mol % or at least 15 mol %.

In some embodiments the ratio of the proportions of cordierite to sodium metasilicate (each in mole percentages) is at least 1.2, such as 1.4. Alternatively or in addition, this ratio does not exceed a value of 3.5 or 2.5. In some embodiments the proportion of cordierite exceeds the proportion of orthoclase in the glass. In some embodiments the sum of the proportions of albite, orthoclase and cordierite is at least 60 mol %.

One mole of danburite means one mole of $(CaO·B_2O_3·2SiO_2)/4$.

The proportion of danburite in the glasses provided according to the present invention is 0 to 20 mol %. Exemplary proportions in the glass provided according to the present invention are at most 10 mol %, at most 5 mol % or at most 2 mol %.

In some embodiments the glass is free of narsarsukite, parakeldyshite and/or danburite.

Further Components

In addition to the already mentioned components the glass may contain further constituents which here are referred to as "balance". The proportion of the balance of the glass provided according to the present invention may be at most 3 mol % so that the glass properties which are adjusted by a careful selection of suitable base glasses are not compromised. In particular, the content of single oxides may be limited, in particular lithium dioxide to at most 1.5 mol %. In some embodiments the proportion of the balance of the glass is at most 2 mol %, such as at most 1 mol % or at most 0.5 mol %. The balance, in particular, contains oxides which are not contained in the base glasses which are mentioned here. So, in particular, the balance does not contain $SiO_2$, $Al_2O_3$, $ZrO_2$, $TiO_2$, $ZnO$, $MgO$, $CaO$, $SrO$, $BaO$, $Na_2O$ or $K_2O$.

When in this description is mentioned that the glasses are free of a component or a constituent phase or that they do not contain a certain component or constituent phase, then this means that this component or constituent phase is only allowed to be present as an impurity in the glass. This means that it is not added in substantial amounts. Not substantial amounts are according to the present invention amounts of less than 1000 ppm (molar) or less than 300 ppm (molar), such as less than 100 ppm (molar), less than 50 ppm (molar) or less than 10 ppm (molar). The glasses provided according to the present invention may be free of lead, arsenic, antimony, bismuth and/or cadmium.

In the formulas the balance is not mentioned. All formulas, apart from the formulas for the pH value, are designed such that the proportion which consists of the constituent phases is 100%. In the formulas for the pH value the balance is ignored.

After conversion into the oxide composition the proportion of $P_2O_5$ in the glasses provided according to the present invention may be less than 4 mol %, such as less than 3 mol %, less than 2 mol %, less than 1 mol %, or less than 0.5 mol %. In some embodiments, the glasses are free of $P_2O_5$.

After conversion into the oxide composition the ratio of the molar proportion of $B_2O_3$ to the molar proportion of $CaO$ in the glasses provided according to the present invention may be at least 1, such as at least 1.1.

After conversion into the oxide composition the ratio of the molar proportion of $Al_2O_3$ to the molar proportion of MgO in the glasses provided according to the present invention may be at least 1, such as at least 1.1.

After conversion into the oxide composition the ratio of the molar proportion of $Al_2O_3$ to the molar proportion of $K_2O$ in the glasses provided according to the present invention may be at least 1, such as at least 1.1.

After conversion into the oxide composition the proportion of SrO and/or BaO in the glasses provided according to the present invention may be at most 3 mol %, such as at most 2 mol %, at most 1 mol %, or at most 0.5 mol %. In some embodiments, the glasses are free of SrO and/or BaO.

After conversion into the oxide composition the proportion of $Li_2O$ in the glasses provided according to the present invention may be at most 4 mol %, such as at most 3 mol %, at most 2 mol %, at most 1 mol %, or at most 0.5 mol %. In some embodiments, the glasses are free of $Li_2O$.

After conversion into the oxide composition the proportion of fluorine in the glasses provided according to the present invention may be at most 4 mol %, such as at most 3 mol %, at most 2 mol %, at most 1 mol %, or at most 0.5 mol %. In some embodiments, the glasses are free of fluorine.

The exemplary embodiments provided in accordance with the scope of the aforementioned base system result from the requirements of a desired thermal expansion and a desired sodium concentration.

Then, the solution in compliance with the requirements is to achieve a combination of a low removal rate in alkaline environment (cf. above ISO 695), a low pH value and a high acid resistance. This is achieved with the help of the aforementioned formulas (1)-(6). When in this description is referred to the characteristic number for the acid resistance, the removal rate according to ISO 695, the CTE and/or the pH value, then always the calculated value is meant, unless otherwise stated.

An exemplary composition is characterized by the following glass-constituent phases:

TABLE 10

| Constituent phase | Min (mol %) | Max (mol %) |
| --- | --- | --- |
| reedmergnerite | 0 | 20 |
| albite | 20 | 50 |
| orthoclase | 10 | 25 |
| natrosilite | 5 | 20 |
| sodium metasilicate | 0.5 | 15 |
| parakeldyshite | 0 | 5 |
| narsarsukite | 0 | 5 |
| disodium zinc silicate | 1 | 17 |
| cordierite | 7 | 21 |
| danburite | 0 | 1 |

The present invention also provides a method for the production of a glass provided according to the present invention with the steps:

melting of the glass raw materials,
optionally shaping of a glass article, in particular a glass tube, a glass ribbon or a glass pane, from the glass melt,
cooling of the glass.

The shaping of the glass may comprise a drawing method, in particular a tube drawing method or a drawing method for flat glass, such as in particular down draw methods, e.g. slot down draw or overflow fusion methods.

The cooling may be conducted by active cooling with the help of a cooling agent, e.g. a cooling fluid, or by passively allowing to cool. In some embodiments a desired mean cooling rate of at least 400 K/min*600 μm/thickness of the glass article is used, wherein a mean value of at least 450 K/min*600 μm/thickness of the glass article may also be used. For example, for a 100 μm thick glass article the cooling rate may be at least 2400 K/min, such as 2700 K/min. Here, the desired final thickness of the shaping (product) is meant. A high cooling rate improves the ion exchangeability, because the glass which has been cooled such has a higher fictive temperature and thus a lower density than a glass which has been cooled slower (cf. U.S. Pat. No. 9,914,660 B2). Furthermore it was shown that a higher cooling rate which in an exemplary drawing method correlates with the drawing speed results in a process which can be controlled better with respect to the minimization of waviness and warp of the glasses such prepared. A possible explanation for this finding is that glass is a viscoelastic material which at the same temperature in the limiting case of infinitely slow processes shows a behavior like a viscous liquid and in the limiting case of infinitely fast processes shows a behavior like an elastic solid. Thus, fast processes support the smoothing by drawing of the glass article during the drawing process.

But it has to be considered that an extremely high cooling rate may result in tensions in the glass which in turn may result in defects in the glass. It has to be considered that, when thin glass drawing is conducted, the useable part of the thin glass article may be present between two thickenings at the sides, the so-called bulb edges, and that the drawing of the glass is conducted by mechanical guiding along the bulb edges. Between the bulb edges and a useable part of the glass the temperature difference should not be too high. Thus, in some exemplary embodiments the cooling rate is limited to a mean value of at most 1000 K/min*600 μm/thickness of the glass article. Here, the desired final thickness of the article (product) is meant.

The cooling rate which is described in the above paragraphs relates to the mean cooling rate with which the glass melt is cooled from a temperature T1 to a temperature T2, wherein the temperature T1 is at least higher than the glass transition temperature $T_G$ of the glass and the temperature T2 is at least 150° C. lower than T1.

According to the present invention, besides the glass, are also glass articles being formed from the glass such as glass ribbons, glass panes, glass wafers, glass tubes and vessels (such as bottles, ampoules, cartridges, syringes) as well as the use of the glass for the chemical tempering and the use for the production of glass tubes and pharmaceutical vessels, in particular primary packaging. In some embodiments, the glass articles are intended for use as packaging for pharmaceutical products, in particular as vessels for liquids. In the context of these uses the hydrolytic and the alkali resistance are of particular interest.

Exemplary glass articles have thicknesses (the thickness may relate to a wall thickness, e.g. of a pharmaceutical container) of less than 2 mm, in particular less than 1 mm, less than 500 μm, less than 200 μm, less than 100 μm or even less than 50 μm. Especially for such thin glasses the glass provided according to the present invention is suitable, because compared to similar glasses of the prior art it contains less albite. In the case of these very thin glasses the loss of exchange depth associated therewith is acceptable.

In some embodiments, the glass article has a cooling state which corresponds to a continuous cooling from a temperature T1 to a temperature T2 with a cooling rate K of at least 400 K/min*600 μm/thickness of the glass article, wherein the temperature T1 is at least higher than the glass transition temperature $T_G$ of the glass and the temperature T2 is at least 150° C. lower than T1. Here, the desired final thickness of the article (product) is meant. In some embodiments K is at least 450 K/min*600 μm/thickness of the glass article. K may be limited to at most 1000 K/min*600 μm/thickness of the glass article. On a glass article the respective cooling rate can be measured easily, such as described in U.S. Pat. No. 9,914,660 B2. The relationships and explanations with respect to the cooling rate which are given there also apply to the present invention. In particular, a glass article which has been cooled faster has a lower density than an article which has been cooled slower.

In the following, the results of an examination of a high number of glass compositions from the prior art, whether the compositions can be described with the base glass system of the present invention and, when this is the case, whether the composition ranges overlap, are given.

COMPARATIVE EXAMPLE 1

The first comparative example is a commercially available glass having the following composition:

TABLE 11

| # | Oxide | Mol % |
|---|-------|-------|
| 1. | $SiO_2$ | 66.7 |
| 2. | $TiO_2$ | 0 |
| 3. | $ZrO_2$ | 0 |
| 4. | $B_2O_3$ | 4.3 |
| 5. | $Al_2O_3$ | 12.8 |
| 6. | ZnO | 0 |
| 7. | MgO | 2.3 |
| 8. | CaO | 0 |
| 9. | $Na_2O$ | 13.8 |
| 10. | $K_2O$ | 0 |

The conversion into constituent phases results in:

TABLE 12

| Constituent phase | Proportion/mol % |
|-------------------|------------------|
| reedmergnerite | 34.4 |
| albite | 84 |
| orthoclase | 0 |
| natrosilite | −80.6 |
| sodium metasilicate | 51.7 |
| parakeldyshite | 0 |
| narsarsukite | 0 |
| disodium zinc silicate | 0 |
| cordierite | 10.4 |
| danburite | 0 |

Thus, the glass does not belong to the base system according to the present invention.

COMPARATIVE EXAMPLES 2-9

The comparative examples 2-9 are extracted from DE 10 2015 116097 A1. DE 10 2015 116097 A1 teaches chemically temperable glasses with high hydrolytic resistance. DE 10 2015 116097 A1 delineates the differences with respect to prior art prevailing at that time by discussing the disadvantages of the following examples which are called V1-8 there. They have the composition:

TABLE 13

| # | Oxide | V1 | V2 | V3 | V4 | V5 | V6 | V7 | V8 |
|---|-------|----|----|----|----|----|----|----|----|
| | | | | | Mol % | | | | |
| 1. | $SiO_2$ | 71 | 76 | 60.9 | 75.6 | 70 | 71 | 74.1 | 67.5 |
| 2. | $TiO_2$ | 0 | 0 | 0 | 0 | 0 | 0 | 0 | 0 |
| 3. | $ZrO_2$ | 1 | 1 | 3.7 | 0 | 0 | 0 | 0 | 0 |
| 4. | $B_2O_3$ | 0 | 0 | 0 | 0 | 0 | 0 | 0 | 0 |
| 5. | $Al_2O_3$ | 11 | 7 | 16.5 | 6 | 6 | 5 | 10.5 | 8.7 |
| 6. | ZnO | 0 | 0 | 0 | 0 | 0 | 0 | 0 | 0 |
| 7. | MgO | 5 | 4 | 2.1 | 6.8 | 8 | 10 | 7.8 | 9.9 |
| 8. | CaO | 1 | 1 | 1.7 | 0.4 | 8 | 10 | 5.6 | 9.9 |
| 9. | $Na_2O$ | 10 | 10 | 12.2 | 11.2 | 8 | 4 | 2 | 4 |
| 10. | $K_2O$ | 1 | 1 | 2.9 | 0.1 | 0 | 0 | 0 | 0 |

The conversion into constituent phases shows that none of the compositions V1-V8 belongs to the base system according to the present invention.

COMPARATIVE EXAMPLES 10-17

The comparative examples 10-17 are the examples of DE 10 2015 116097 A1 which correspond to the present invention there and which are called glass 1-8 there. They have the composition:

TABLE 14

| # | Oxide | 1 | 2 | 3 | 4 | 5 | 6 | 7 | 8 |
|---|-------|---|---|---|---|---|---|---|---|
| | | | | | Mol % | | | | |
| 1. | $SiO_2$ | 65.9 | 70.2 | 68.8 | 72.5 | 68.2 | 68 | 68.2 | 64 |
| 2. | $TiO_2$ | 0 | 0 | 0 | 0 | 0 | 1.5 | 3.1 | 0 |
| 3. | $ZrO_2$ | 0 | 0 | 0 | 0 | 1.1 | 0 | 0 | 0 |
| 4. | $B_2O_3$ | 0 | 0 | 0 | 0 | 0 | 0 | 0 | 0 |
| 5. | $Al_2O_3$ | 11.7 | 10.4 | 11.3 | 9.1 | 11.8 | 12 | 11.8 | 12 |
| 6. | ZnO | 0 | 0 | 0 | 0 | 0 | | 0 | 0 |
| 7. | MgO | 10.1 | 8 | 7 | 7 | 3.2 | | 1.2 | 12 |
| 8. | CaO | 6.2 | 2 | 3 | 3 | 5.2 | | 5.2 | 8 |
| 9. | $Na_2O$ | 6.1 | 9 | 10 | 8.5 | 10.5 | 12 | 10.5 | 4 |
| 10. | $K_2O$ | 0 | 0.5 | 0 | 0 | 0 | 0.5 | 0 | 0 |
| 11. | F | 0 | 0 | 0 | 0 | 0 | 1 | 0 | 0 |

The conversion into constituent phases shows that none of the compositions 1-8 belongs to the base system according to the present invention.

COMPARATIVE EXAMPLES 18-162

The comparative examples 18-162 are the examples of U.S. Pat. No. 9,783,453 B2 which correspond to the present invention there and which are specified by the serial numbers 1-145 there. They all contain at least 4 mol % of $P_2O_5$ and they do not belong to the base system according to the present invention.

COMPARATIVE EXAMPLES 163-213

The comparative examples 163-213 are the examples of US 2015/030827 A1 which correspond to the present invention there and which are specified by the serial numbers A1-A27 as well as C1-C24 there. They all contain less than 8% of $Na_2O$ and they do not belong to the base system according to the present invention.

COMPARATIVE EXAMPLES 214-261

The comparative examples 214-261 are the examples of U.S. Pat. No. 9,701,580 B2 which correspond to the present invention there and which are specified by the serial numbers 1-48 there. According to the main claim 1 a glass product of a glass comprising 59 mol %-76 mol % of $SiO_2$, 16 mol %-20 mol % of $Al_2O_3$, 0 mol % of $B_2O_3$, 0 mol %-20 mol % of $Li_2O$, 12.3 mol %-20 mol % of $Na_2O$, 0 mol %-8 mol % of $K_2O$, 0 mol %-10 mol % of MgO and 0 mol %-10 mol % of ZnO is claimed, wherein $Al_2O_3$ (mol %)-$Na_2O$ (mol %)>=−4 mol %; in addition, for the glass a certain value range (20 to 64 kilopoise) for the "liquidus viscosity" (this term means the viscosity at the liquidus point) and for the glass product a compressive stress with a minimum value of 1.1 GPa at the surface are demanded.

About the examples mentioned in U.S. Pat. No. 9,701,580 B2: The numbers 1-6 are discussed in the next tables. The numbers 7-10 all contain more than 15% of aluminum oxide and they do not belong to the base system according to the present invention. The numbers 11-16 are discussed in the next tables. The numbers 17-20 all contain more than 15%, even more than 16% of aluminum oxide and they do not belong to the base system according to the present invention. The numbers 21-26 all contain more than 7% of calcium oxide and at the same time no boron oxide and they do not belong to the base system according to the present invention. The numbers 27-40 all contain more than 14% of aluminum oxide and they do not belong to the base system according to the present invention. The numbers 41-48 all contain more than 3% of strontium oxide or barium oxide and they do not belong to the base system according to the present invention.

TABLE 15

| # | Oxide | 1 | 2 | 3 | 4 | 5 | 6 |
|---|---|---|---|---|---|---|---|
| | | | | Mol % | | | |
| 1. | $SiO_2$ | 75.83 | 73.7 | 70.88 | 68.07 | 65.33 | 62.77 |
| 2. | $TiO_2$ | 0 | 0 | 0 | 0 | 0 | 0 |
| 3. | $ZrO_2$ | 0 | 0 | 0 | 0 | 0 | 0 |
| 4. | $B_2O_3$ | 0 | 0 | 0 | 0 | 0 | 0 |
| 5. | $Al_2O_3$ | 0.07 | 2.71 | 5.32 | 7.99 | 10.72 | 13.31 |
| 6. | ZnO | 0 | 0 | 0 | 0 | 0 | 0 |
| 7. | MgO | 8.11 | 7.62 | 7.88 | 7.98 | 7.95 | 7.9 |
| 8. | CaO | 0.19 | 0.07 | 0.09 | 0.09 | 0.09 | 0.08 |
| 9. | $Na_2O$ | 15.63 | 15.73 | 15.68 | 15.71 | 15.74 | 15.78 |
| 10. | $K_2O$ | 0 | 0 | 0 | 0 | 0 | 0 |
| 11. | SnO2 | 0.16 | 0.16 | 0.16 | 0.16 | 0.16 | 0.15 |

The conversion into constituent phases shows that none of the compositions 1-6 belongs to the base system according to the present invention.

TABLE 16

| # | Oxide | 11 | 12 | 13 | 14 | 15 | 16 |
|---|---|---|---|---|---|---|---|
| | | | | Mol % | | | |
| 1. | $SiO_2$ | 76.35 | 73.53 | 71.04 | 68.24 | 65.5 | 62.91 |
| 2. | $TiO_2$ | 0 | 0 | 0 | 0 | 0 | 0 |
| 3. | $ZrO_2$ | 0 | 0 | 0 | 0 | 0 | 0 |
| 4. | $B_2O_3$ | 0 | 0 | 0 | 0 | 0 | 0 |
| 5. | $Al_2O_3$ | 0.02 | 2.72 | 5.34 | 8.03 | 10.74 | 13.38 |
| 6. | ZnO | 8.06 | 7.98 | 7.86 | 7.93 | 8.03 | 7.82 |
| 7. | MgO | 0 | 0 | 0 | 0 | 0 | 0 |
| 8. | CaO | 0 | 0 | 0 | 0 | 0 | 0 |
| 9. | $Na_2O$ | 15.42 | 15.61 | 15.61 | 15.64 | 15.57 | 15.74 |
| 10. | $K_2O$ | 0 | 0 | 0 | 0 | 0 | 0 |
| 11. | SnO2 | 0.15 | 0.15 | 0.15 | 0.15 | 0.15 | 0.15 |

The conversion into constituent phases shows that none of the compositions 11-16 in U.S. Pat. No. 9,701,580 B2 belongs to the base system according to the present invention.

COMPARATIVE EXAMPLES 262-354

The comparative examples 262-354 are the embodiment examples of U.S. Pat. No. 9,156,725 B2 which correspond to the present invention there and which are specified by the serial numbers 1-93 there. According to the main claim 1 a glass comprising at least 55 mol % of $SiO_2$, a proportion of $Al_2O_3$ which is not quantified in this claim, less than 10 mol % of $Li_2O$, a proportion of $Na_2O$ which is not quantified in this claim and a proportion of MgO, CaO and/or ZnO which is not quantified in this claim is claimed, wherein the viscosity at the liquidus point is at least 200 kilopoise and the modulus of elasticity is at least 80 GPa.

The numbers 1-93 all contain more than 4% of lithium oxide and they do not belong to the base system according to the present invention.

COMPARATIVE EXAMPLES 355-589

The comparative examples 355-589 are the embodiment examples of U.S. Pat. No. 9,517,967 B2 which correspond to the present invention there and which are specified by the serial numbers 1-235 there. U.S. Pat. No. 9,517,967 B2 claims in the main claim 1 a glass comprising at least 50 mol % of $SiO_2$, at least 10 mol % of $R_2O$, wherein at least 10 percent thereof are $Na_2O$, 12 mol % to 22 mol % of $Al_2O_3$, >0 mol % to 5 mol % of $B_2O_3$, at least 0.1 mol % of MgO and/or ZnO, wherein $B_2O_3$ (mol %)-($R_2O$ (mol %)-$Al_2O_3$ (mol %))>=4.5.

Number 1 contains more than 13% of aluminum oxide and it is not according to the present invention. The numbers 2-4 are discussed in the next tables. The numbers 5-8 contain more than 13% of aluminum oxide and they are not according to the present invention. The numbers 9-11 are discussed in the next tables. The numbers 12-24 contain more than 13% of aluminum oxide and they are not according to the present invention. Number 25 is discussed in the next tables. Number 26 contains more than 13% of aluminum oxide and it is not according to the present invention. Number 27 is discussed in the next tables. The numbers 28-30 contain more than 13% of aluminum oxide and they are not according to the present invention. The numbers 31-32 are discussed in the next tables. The numbers 33-72 contain more than 13% of aluminum oxide and they are not according to the present invention. The numbers 73-74 are discussed in the next tables. The numbers 75-103 contain more than 13% of aluminum oxide and they are not according to the present invention. The numbers 104-109 are discussed in the next tables.

TABLE 17

| # | Oxide | 2 | 3 | 4 | 9 | 10 | 11 | 25 | 27 |
|---|---|---|---|---|---|---|---|---|---|
| | | | | | | Mol % | | | |
| 1. | $SiO_2$ | 64.85 | 64.93 | 64.94 | 65.08 | 65.24 | 64.78 | 64.78 | 64.22 |
| 2. | $TiO_2$ | 0 | 0 | 0 | 0 | 0 | 0 | 0 | 0 |
| 3. | $ZrO_2$ | 0 | 0 | 0 | 0 | 0 | 0 | 0 | 0 |
| 4. | $B_2O_3$ | 6.81 | 6.47 | 6.3 | 5.78 | 5.47 | 5.55 | 7.12 | 7.03 |
| 5. | $Al_2O_3$ | 13.01 | 12.7 | 12.5 | 12.96 | 12.91 | 12.87 | 12 | 12.98 |
| 6. | ZnO | 0 | 0 | 0 | 0 | 0 | 0 | 0 | 0.9 |
| 7. | MgO | 1.53 | 2.52 | 3.04 | 2.49 | 3.01 | 2.08 | 2.04 | 0.01 |
| 8. | CaO | 0.08 | 0.08 | 0.09 | 0.09 | 0.09 | 1 | 0.07 | 0.06 |
| 9. | $Na_2O$ | 13.09 | 12.69 | 12.51 | 13 | 12.67 | 13.11 | 13.8 | 14.16 |
| 10. | $K_2O$ | 0.51 | 0.51 | 0.51 | 0.51 | 0.51 | 0.51 | 0.49 | 0.52 |

The conversion into constituent phases shows that the examples which are specified in U.S. Pat. No. 9,517,967 B2 with 2-4 and 9-11 and 25 and 27 do not belong to the base system according to the present invention.

TABLE 18

| # | Oxide | 31 | 32 | 73 | 74 | 104 | 105 | 106 | 107 | 108 | 109 |
|---|---|---|---|---|---|---|---|---|---|---|---|
| | | | | | | Mol % | | | | | |
| 1. | $SiO_2$ | 64.28 | 67.18 | 67.2 | 66.34 | 66.63 | 66.1 | 65.83 | 65.95 | 65.98 | 65.82 |
| 2. | $TiO_2$ | 0 | 0 | 0 | 0 | 0 | 0 | 0 | 0 | 0 | 0 |
| 3. | $ZrO_2$ | 0 | 0 | 0 | 0 | 0 | 0 | 0 | 0 | 0 | 0 |
| 4. | $B_2O_3$ | 7.04 | 5.65 | 2.54 | 3.57 | 3.58 | 3.46 | 3.46 | 3.36 | 3.28 | 3.54 |
| 5. | $Al_2O_3$ | 11.99 | 12.78 | 12.08 | 12.71 | 12.96 | 12.86 | 12.81 | 12.8 | 12.8 | 12.84 |
| 6. | ZnO | 1.79 | 0 | 0 | 0 | 0 | 0 | 0 | 0 | 0 | 0 |
| 7. | MgO | 0.01 | 0.54 | 3.8 | 3.28 | 3.62 | 4.54 | 4.84 | 4.94 | 4.97 | 4.73 |
| 8. | CaO | 0.06 | 0.02 | 0.05 | 0.05 | 0.04 | 0.05 | 0.05 | 0.05 | 0.05 | 0.05 |
| 9. | $Na_2O$ | 14.21 | 13.7 | 14.18 | 13.94 | 13.09 | 12.89 | 12.92 | 12.81 | 12.82 | 12.94 |
| 10. | $K_2O$ | 0.5 | 0 | 0 | 0 | 0 | 0 | 0 | 0 | 0 | 0 |

The conversion into constituent phases shows that the examples which are specified in U.S. Pat. No. 9,517,967 B2 with 31-32 do not belong to the base system according to the present invention. The conversion into constituent phases shows further that the examples which are specified in U.S. Pat. No. 9,517,967 B2 with 73-74 as well as 105-109 also do not belong to the base system according to the present invention.

TABLE 19

| # | Oxide | 175 | 176 | 177 | 178 | 179 |
|---|---|---|---|---|---|---|
| | | | | Mol % | | |
| 1. | $SiO_2$ | 65.59 | 65.69 | 65.84 | 65.58 | 65.66 |
| 2. | $TiO_2$ | 0 | 0 | 0 | 0 | 0 |
| 3. | $ZrO_2$ | 0 | 0 | 0 | 0 | 0 |
| 4. | $B_2O_3$ | 5.11 | 5.2 | 5.03 | 5.24 | 5.11 |
| 5. | $Al_2O_3$ | 12.98 | 12.86 | 12.84 | 12.88 | 12.97 |
| 6. | ZnO | 0 | 0 | 0 | 0 | 0 |
| 7. | MgO | 1.84 | 1.69 | 1.67 | 1.83 | 2.11 |
| 8. | CaO | 0.04 | 0.04 | 0.04 | 0.04 | 0.04 |

TABLE 19-continued

| # | Oxide | 175 | 176 | 177 | 178 | 179 |
|---|---|---|---|---|---|---|
| | | | | Mol % | | |
| 9. | $Na_2O$ | 14.25 | 14.39 | 14.38 | 14.29 | 13.92 |
| 10. | $K_2O$ | 0.07 | 0.07 | 0.07 | 0.07 | 0.07 |

The conversion into constituent phases shows that the examples which are specified in U.S. Pat. No. 9,517,967 B2 with 175-179 do not belong to the base system according to the present invention.

COMPARATIVE EXAMPLES 590-612

The comparative examples 590-612 are the embodiment examples of US 2014/050911 A1 which correspond to the present invention there and which are specified by "base glass" and/or the alphabetic serial characters A-V there. In this document in its main claim 1 a glass and a glass product comprising at least 65 mol % of $SiO_2$ and at least 6 mol % of $Na_2O$ are claimed, wherein the coefficients of thermal expansion above and below the glass transition should differ from each other by less than 10.7 ppm/K and the glass product is a pane with a thickness of less than 400 μm.

The "base glass" as well as also the alphabetic characters A-E are discussed in the following tables. The alphabetic characters F-K contain more than 1.5% of lithium oxide and they do not belong to the base system according to the present invention. The alphabetic characters L-N are discussed in the following tables.

TABLE 20

| # | Oxide | Base glass | A | B | C | D | E | L | M | N |
|---|---|---|---|---|---|---|---|---|---|---|
| | | | | | Mol % | | | | | |
| 1. | $SiO_2$ | 69.07 | 70.34 | 72.05 | 71.98 | 69.75 | 70.51 | 68.93 | 68.91 | 69.14 |
| 2. | $TiO_2$ | 0 | 0 | 0 | 0 | 0 | 0 | 0 | 0 | 0 |
| 3. | $ZrO_2$ | 0 | 0 | 0 | 0 | 0 | 0 | 1.74 | 3.49 | 4.9 |
| 4. | $B_2O_3$ | 0 | 0 | 0 | 0 | 0 | 0 | 0 | 0 | 0 |
| 5. | $Al_2O_3$ | 10.21 | 9.71 | 9.23 | 9.23 | 10.21 | 10.2 | 10.21 | 10.25 | 10.27 |
| 6. | ZnO | 0 | 0 | 0 | 2.34 | 0 | 0 | 0 | 0 | 0 |
| 7. | MgO | 5.32 | 5.22 | 4.83 | 2.47 | 5.4 | 5.38 | 3.66 | 1.83 | 0.03 |
| 8. | CaO | 0.06 | 0.05 | 0.05 | 0.04 | 0.05 | 0.06 | 0.04 | 0.04 | 0.05 |
| 9. | $Na_2O$ | 15.18 | 14.52 | 13.68 | 13.8 | 13.68 | 12.19 | 15.26 | 15.32 | 15.47 |
| 10. | $K_2O$ | 0 | 0 | 0 | 0 | 0 | 0 | 0 | 0 | 0 |

The conversion into constituent phases shows that the examples which are specified in US 2014/050911 A1 with base glass and/or A-E do not belong to the base system according to the present invention. The conversion into constituent phases shows further that the examples which are specified in US 2014/050911 Al with L-N do not belong to the base system according to the present invention.

COMPARATIVE EXAMPLES 613-647

The comparative examples 613-647 are the examples of U.S. Pat. No. 9,822,032 B2 which correspond to the present invention there and which are specified by the serial numbers 1-35 there. In this document in its main claim 1 a glass and a glass product comprising at least 65 mol % of $SiO_2$ and at least 6 mol % of $Na_2O$ are claimed, wherein the coefficients of thermal expansion above and below the glass transition should differ from each other by less than 10.7 ppm/K and the glass product is a pane with a thickness of less than 400 μm.

The numbers 1-35 are discussed in the following tables.

TABLE 21

| # | Oxide | 1 | 2 | 3 | 4 | 5 | 6 | 7 |
|---|---|---|---|---|---|---|---|---|
| | | | | | Mol % | | | |
| 1. | $SiO_2$ | 67.26 | 67.47 | 67.37 | 67.43 | 67.22 | 67.12 | 67.29 |
| 2. | $TiO_2$ | 0 | 0 | 0 | 0 | 0 | 0 | 0 |
| 3. | $ZrO_2$ | 0.01 | 0.01 | 0.01 | 0.01 | 0.01 | 0.01 | 0.01 |
| 4. | $B_2O_3$ | 2.58 | 2.56 | 2.54 | 2.61 | 2.61 | 2.64 | 2.64 |
| 5. | $Al_2O_3$ | 12.05 | 12.08 | 12.07 | 12.03 | 12.03 | 12.03 | 12.05 |
| 6. | ZnO | 0 | 0 | 0 | 0 | 0.41 | 0.42 | 0.45 |
| 7. | MgO | 3.8 | 3.69 | 3.34 | 3.27 | 3.34 | 3.36 | 2.82 |
| 8. | CaO | 0.05 | 0.04 | 0.04 | 0.49 | 0.06 | 0.05 | 0.48 |
| 9. | $Na_2O$ | 14.14 | 13.08 | 14.1 | 13.1 | 14.2 | 13.33 | 13.2 |
| 10. | $K_2O$ | 0.01 | 0.96 | 0.01 | 0.96 | 0.03 | 0.94 | 0.96 |

The conversion into constituent phases shows that the examples which are specified in U.S. Pat. No. 9,822,032 B2 with 1-7 do not belong to the base system according to the present invention.

TABLE 22

| # | Oxide | 8 | 9 | 10 | 11 | 12 | 13 | 14 |
|---|---|---|---|---|---|---|---|---|
| | | | | | Mol % | | | |
| 1. | $SiO_2$ | 67.25 | 66.32 | 66.32 | 66.22 | 66.26 | 67.28 | 67.29 |
| 2. | $TiO_2$ | 0 | 0 | 0 | 0 | 0 | 0 | 0 |
| 3. | $ZrO_2$ | 0.01 | 0.01 | 0.02 | 0.01 | 0.01 | 0.01 | 0.01 |
| 4. | $B_2O_3$ | 2.63 | 3.53 | 3.64 | 3.62 | 3.63 | 3.41 | 3.44 |
| 5. | $Al_2O_3$ | 12.04 | 12.73 | 12.76 | 12.72 | 12.74 | 12.04 | 12.03 |
| 6. | ZnO | 0.89 | 0 | 0 | 0.4 | 0.45 | 0 | 0 |
| 7. | MgO | 2.76 | 3.31 | 2.84 | 2.85 | 2.32 | 2.79 | 2.77 |
| 8. | CaO | 0.05 | 0.05 | 0.48 | 0.05 | 0.47 | 0.49 | 0.49 |
| 9. | $Na_2O$ | 13.3 | 13.93 | 12.89 | 13.07 | 13.06 | 13.87 | 12.93 |
| 10. | $K_2O$ | 0.96 | 0.03 | 0.95 | 0.96 | 0.97 | 0.01 | 0.94 |

The conversion into constituent phases shows that the examples which are specified in U.S. Pat. No. 9,822,032 B2 with 8-14 do not belong to the base system according to the present invention.

TABLE 23

| # | Oxide | 15 | 16 | 17 | 18 | 19 | 20 | 21 |
|---|---|---|---|---|---|---|---|---|
| | | | | | Mol % | | | |
| 1. | $SiO_2$ | 67.18 | 66.27 | 66.33 | 66.16 | 67.23 | 67.61 | 66.82 |
| 2. | $TiO_2$ | 0 | 0 | 0 | 0 | 0 | 0 | 0 |
| 3. | $ZrO_2$ | 0.01 | 0.01 | 0.01 | 0.01 | 0.01 | 0.01 | 0.01 |
| 4. | $B_2O_3$ | 3.39 | 3.54 | 3.53 | 3.58 | 3.63 | 3.64 | 3.51 |
| 5. | $Al_2O_3$ | 12 | 12.74 | 12.73 | 12.73 | 12.72 | 12.24 | 12.59 |
| 6. | ZnO | 0.88 | 0.9 | 1.33 | 0.91 | 0 | 0 | 0 |
| 7. | MgO | 1.82 | 2.27 | 1.79 | 1.84 | 2.34 | 2.35 | 2.45 |
| 8. | CaO | 0.49 | 0.05 | 0.04 | 0.48 | 0.05 | 0.06 | 0.05 |
| 9. | $Na_2O$ | 14.1 | 14.11 | 14.12 | 14.19 | 13.91 | 13.96 | 14.47 |
| 10. | $K_2O$ | 0.04 | 0.01 | 0.01 | 0.01 | 0.01 | 0.04 | 0.01 |

The conversion into constituent phases shows that the examples which are specified in U.S. Pat. No. 9,822,032 B2 with 15-21 do not belong to the base system according to the present invention.

TABLE 23

| # | Oxide | 22 | 23 | 24 | 25 | 26 | 27 | 28 |
|---|---|---|---|---|---|---|---|---|
| | | | | | Mol % | | | |
| 1. | $SiO_2$ | 66.59 | 67.05 | 66.38 | 66.98 | 67.05 | 67.09 | 67.23 |
| 2. | $TiO_2$ | 0 | 0 | 0 | 0 | 0 | 0 | 0 |

TABLE 23-continued

| # | Oxide | 22 | 23 | 24 | 25 | 26 | 27 | 28 |
|---|---|---|---|---|---|---|---|---|
| | | | | | Mol % | | | |
| 3. | $ZrO_2$ | 0.01 | 0.01 | 0.03 | 0.01 | 0.01 | 0.01 | 0.01 |
| 4. | $B_2O_3$ | 3.42 | 2.91 | 3.56 | 3.98 | 3.99 | 3.62 | 4.1 |
| 5. | $Al_2O_3$ | 12.41 | 12.16 | 12.71 | 12.69 | 12.56 | 12.67 | 12.67 |
| 6. | ZnO | 0.28 | 0.64 | 1.19 | 0.06 | 0.65 | 0.06 | 0 |
| 7. | MgO | 3.01 | 2.88 | 1.79 | 2.21 | 2.05 | 2.24 | 1.83 |
| 8. | CaO | 0.12 | 0.06 | 0.04 | 0.03 | 0.03 | 0.03 | 0.06 |
| 9. | $Na_2O$ | 13.4 | 13.34 | 14.19 | 13.91 | 13.55 | 14.16 | 13.97 |
| 10. | $K_2O$ | 0.66 | 0.85 | 0.01 | 0.01 | 0.01 | 0.01 | 0.03 |

The conversion into constituent phases shows that the examples which are specified in U.S. Pat. No. 9,822,032 B2 with 22-28 do not belong to the base system according to the present invention.

TABLE 24

| # | Oxide | 29 | 30 | 31 | 32 | 33 | 34 | 35 |
|---|---|---|---|---|---|---|---|---|
| | | | | | Mol % | | | |
| 1. | $SiO_2$ | 67.31 | 67.32 | 66.96 | 67.43 | 67.09 | 67.45 | 67.11 |
| 2. | $TiO_2$ | 0 | 0 | 0 | 0 | 0 | 0 | 0 |
| 3. | $ZrO_2$ | 0.01 | 0.01 | 0.01 | 0.01 | 0.01 | 0.01 | 0.01 |
| 4. | $B_2O_3$ | 4.25 | 3.76 | 3.96 | 3.93 | 4.15 | 4.07 | 4.12 |
| 5. | $Al_2O_3$ | 12.54 | 12.65 | 12.63 | 12.56 | 12.66 | 12.46 | 12.57 |
| 6. | ZnO | 0 | 0 | 0 | 0 | 0 | 0 | 0 |
| 7. | MgO | 2.11 | 2.37 | 2.47 | 2.41 | 2.33 | 2.38 | 2.42 |
| 8. | CaO | 0.04 | 0.04 | 0.04 | 0.03 | 0.04 | 0.03 | 0.04 |
| 9. | $Na_2O$ | 13.62 | 13.76 | 13.84 | 13.54 | 13.64 | 13.5 | 13.64 |
| 10. | $K_2O$ | 0.01 | 0.01 | 0.01 | 0.01 | 0.01 | 0.01 | 0.01 |

The conversion into constituent phases shows that the examples which are specified in U.S. Pat. No. 9,822,032 B2 with 29-35 do not belong to the base system according to the present invention.

COMPARATIVE EXAMPLES 648-869

The comparative examples 648-869 are the embodiment examples of US 2015/147575 A1 which correspond to the present invention there and which are specified by the alphabetic serial characters A-E and the serial numbers 1-56 there. According to main claim 1 US 2015/147575 A1 claims a glass comprising 50 mol %-72 mol % of $SiO_2$, 12 mol %-22 mol % of $Al_2O_3$, up to 6.5 mol % of $B_2O_3$, up to 1 mol % of $P_2O_5$, 11 mol %-21 mol % of $Na_2O$, up to 0.95 mol % of $K_2O$, up to 4 mol % of MgO, up to 5 mol % of ZnO, up to 2 mol % of CaO, wherein the following is true: $Na_2O + K_2O - Al_2O_3 \sim 2.0$ mole, $B_2O_3 - (Na_2O + K_2O - Al_2O_3) > 1$ mol %, 24 mol % < $RaIO_4$ < 45 mol %, wherein R is at least one of Na, K and Ag, and the glass is substantially free of $TiO_2$. The examples of US 2015/147575 A1 which are specified by the alphabetic serial characters A-E and the serial numbers 1-56 all contain at least 13% of aluminum oxide and they do not belong to the base system according to the present invention. Number 57 is discussed in the following tables.

TABLE 25

| # | Oxide | 57 | 96 | 121 | 129 | 138 | 152 | 153 |
|---|---|---|---|---|---|---|---|---|
| | | | | | Mol % | | | |
| 1. | $SiO_2$ | 67.18 | 70.65 | 67.63 | 65.24 | 65.08 | 64.44 | 68.6 |
| 2. | $TiO_2$ | 0 | 0 | 0 | 0 | 0 | 0 | 0 |
| 3. | $ZrO_2$ | 0 | 0 | 0 | 0 | 0 | 0 | 0 |
| 4. | $B_2O_3$ | 5.65 | 3.95 | 6.03 | 5.47 | 5.78 | 10.01 | 5.08 |

TABLE 25-continued

| # | Oxide | 57 | 96 | 121 | 129 Mol % | 138 | 152 | 153 |
|---|---|---|---|---|---|---|---|---|
| 5. | $Al_2O_3$ | 12.78 | 12.35 | 12.84 | 12.91 | 12.96 | 12.27 | 12.86 |
| 6. | ZnO | 0 | 0 | 0 | 0 | 0 | 0 | 0 |
| 7. | MgO | 0.54 | 0.02 | 0.01 | 3.01 | 2.49 | 0.01 | 0.01 |
| 8. | CaO | 0.02 | 0.07 | 0.07 | 0.09 | 0.09 | 0.02 | 0.07 |
| 9. | $Na_2O$ | 13.7 | 12.35 | 12.81 | 12.67 | 13 | 12.16 | 12.75 |
| 10. | $K_2O$ | 0 | 0.51 | 0.51 | 0.51 | 0.51 | 0.95 | 0.52 |

The conversion into constituent phases shows that the examples which are specified in US 2015/147575 A1 with 57, 96, 121, 129, 138, 152, 153 do not belong to the base system according to the present invention.

TABLE 26

| # | Oxide | 154 | 156 | 170 | 174 | 175 Mol % | 183 | 186 | 187 |
|---|---|---|---|---|---|---|---|---|---|
| 1. | $SiO_2$ | 64.26 | 64.24 | 64.23 | 64.24 | 64.38 | 64.41 | 65.38 | 64.48 |
| 2. | $TiO_2$ | 0 | 0 | 0 | 0 | 0 | 0 | 0 | 0 |
| 3. | $ZrO_2$ | 0 | 0 | 0 | 0 | 0 | 0 | 0 | 0 |
| 4. | $B_2O_3$ | 8.97 | 9.47 | 10.01 | 9.44 | 9.8 | 10.07 | 7.1 | 10.05 |
| 5. | $Al_2O_3$ | 12.73 | 12.45 | 12.01 | 12.46 | 12.02 | 12.94 | 12.94 | 12.48 |
| 6. | ZnO | 0 | 0 | 0 | 0 | 0 | 0 | 0 | 0 |
| 7. | MgO | 0.01 | 0.01 | 0 | 0.01 | 0.01 | 0.01 | 0.01 | 0.01 |
| 8. | CaO | 0.02 | 0.02 | 0.02 | 0.02 | 0.02 | 0.03 | 0.03 | 0.02 |
| 9. | $Na_2O$ | 12.93 | 12.73 | 11.7 | 12.74 | 12.69 | 11.38 | 13.88 | 11.81 |
| 10. | $K_2O$ | 0.94 | 0.94 | 1.91 | 0.94 | 0.93 | 1.04 | 0.51 | 1.03 |

The conversion into constituent phases shows that the examples which are specified in US 2015/147575 A1 with 154, 156, 170, 174, 175, 186, 187 do not belong to the base system according to the present invention.

TABLE 27

| # | Oxide | 192 | 201 | 202 Mol % | 205 |
|---|---|---|---|---|---|
| 1. | $SiO_2$ | 64.5 | 64.46 | 63.06 | 64.19 |
| 2. | $TiO_2$ | 0 | 0 | 0 | 0 |
| 3. | $ZrO_2$ | 0 | 0 | 0 | 0 |
| 4. | $B_2O_3$ | 7.98 | 7.12 | 10.01 | 10.08 |
| 5. | $Al_2O_3$ | 13 | 12.99 | 12.87 | 12.66 |
| 6. | ZnO | 0 | 0 | 0 | 0 |
| 7. | MgO | 0.01 | 0.01 | 0.01 | 0.01 |
| 8. | CaO | 0.01 | 0.06 | 0.02 | 0.02 |
| 9. | $Na_2O$ | 13.39 | 13.76 | 12.91 | 11.86 |
| 10. | $K_2O$ | 0.99 | 1.48 | 1.02 | 1.05 |

The conversion into constituent phases shows that the examples which are specified in US 2015/147575 A1 with 192, 201, 202, 205 do not belong to the base system according to the present invention.

COMPARATIVE EXAMPLES 870-879

The comparative examples 870-879 are the examples of US 2015/140299 A1 which correspond to the present invention there and which are specified by the serial numbers 1-10 there. According to the main claim 1 US 2015/1402299 A1 claims a glass comprising 50-70 mol % of $SiO_2$, 5-12 mol % of $Al_2O_3$, 5-35 mol % of $B_2O_3$, at least one of $Li_2O$, $Na_2O$ and $K_2O$, wherein the following is true: 1 mol %<=$Li_2O$+ $Na_2O$+$K_2O$<=15%, with up to 5 mol % of MgO, up to 5 mol % of CaO, up to 2 mol % of SrO. The numbers 1-6 contain less than 8 mol % of sodium oxide and they do not belong to the base system according to the present invention. The numbers 7-10 are discussed in the following tables.

TABLE 28

| # | Oxide | 7 | 8 | 9 Mol % | 10 |
|---|---|---|---|---|---|
| 1. | $SiO_2$ | 66.13 | 66.47 | 67.09 | 67.19 |
| 2. | $TiO_2$ | | | 0 | 0 |
| 3. | $ZrO_2$ | 0.02 | 0.01 | 0.01 | 0.01 |
| 4. | $B_2O_3$ | 9.97 | 7.32 | 5.27 | 4.62 |
| 5. | $Al_2O_3$ | 10.71 | 11.63 | 12.21 | 12.47 |
| 6. | ZnO | | | 0 | 0 |
| 7. | MgO | 2.59 | 2.5 | 2.42 | 2.36 |
| 8. | CaO | 0.94 | 0.34 | 0.21 | 0.12 |
| 9. | $Na_2O$ | 9.58 | 11.64 | 12.69 | 13.12 |
| 10. | $K_2O$ | 0.01 | 0.01 | 0.01 | 0.01 |

The conversion into constituent phases shows that the examples which are specified in US 2015/140299 A1 with 7-10 do not belong to the base system according to the present invention.

COMPARATIVE EXAMPLES 880-1014

The comparative examples 880-1014 are the examples of WO 2015/031427 A2 which correspond to the present invention there and which are specified by the serial numbers 1-135 there. The numbers 1-128 all contain more than 13% of aluminum oxide or more than 3% of phosphorus oxide or both and they do not belong to the base system according to the present invention. The numbers 129-134 are discussed in the following tables. Number 135 contains more than 3% of lithium oxide and it does not belong to the base system according to the present invention.

TABLE 29

| # | Oxide | 129 | 130 | 131 | 132 Mol % | 133 | 134 |
|---|---|---|---|---|---|---|---|
| 1. | $SiO_2$ | 67.5 | 65.1 | 64.6 | 64.1 | 58.5 | 58 |
| 2. | $TiO_2$ | 0 | 2 | 2.5 | 3 | 3 | 3.5 |
| 3. | $ZrO_2$ | 0 | 0 | 0 | 0 | 0 | 0 |
| 4. | $B_2O_3$ | 3.7 | 3.9 | 3.9 | 3.9 | 9.7 | 9.7 |
| 5. | $Al_2O_3$ | 12.7 | 12.7 | 12.7 | 12.7 | 12.7 | 12.7 |
| 6. | ZnO | 0 | 0 | 0 | 0 | 0 | 0 |
| 7. | MgO | 2.4 | 2.4 | 2.4 | 2.4 | 2.4 | 2.4 |
| 8. | CaO | 0 | 0 | 0 | 0 | 0 | 0 |
| 9. | $Na_2O$ | 13.6 | 13.8 | 13.8 | 13.8 | 13.6 | 13.6 |
| 10. | $K_2O$ | 0 | 0 | 0 | 0 | 0 | 0 |

The conversion into constituent phases shows that the examples which are specified in WO 2015/031427 A2 with 129-134 do not belong to the base system according to the present invention.

COMPARATIVE EXAMPLES 1015-1026

The comparative examples 1015-1026 are the embodiment examples of US 2017/320769 A1 which correspond to the present invention there and which are specified by the serial numbers 1-12 there. In its main claim 1 in this document an alkali aluminosilicate glass which comprises at least ca. 50 mol % of $SiO_2$, at least ca. 10 mol % of $Na_2O$ and MgO is claimed, wherein the alkali aluminosilicate glass is free of at least one of the constituents $K_2O$, $B_2O_3$, CaO, BaO and $P_2O_5$ and wherein the alkali aluminosilicate glass is characterized by a mass loss of 0.030 mg/cm² or less, when it is immersed into an acid solution of five % by weight of HCl for seven hours. The numbers 1-7 and 10 are discussed in the following tables. The numbers 8, 9, 11, 12 contain more than 1.5% of lithium oxide and they do not belong to the base system according to the present invention. Examples 1 and 7 each contain 1% of lithium oxide which here is part of the balance, number 4 contains 0.99% of lithium oxide and 10 contains 1.02% of lithium oxide which here is also part of the balance each.

TABLE 30

| # | Oxide | 1 | 2 | 3 | 4 | 5 | 6 | 7 | 10 |
|---|-------|---|---|---|---|---|---|---|----|
| | | | | | Mol % | | | | |
| 1. | $SiO_2$ | 68.99 | 69.02 | 68.97 | 68.09 | 68.74 | 67.85 | 67.09 | 66.75 |
| 2. | $TiO_2$ | 0 | 0 | 0 | 0 | 0 | 0 | 0 | 0 |
| 3. | $ZrO_2$ | 0 | 0 | 0 | 0.98 | 0.99 | 0.97 | 1.94 | 2.92 |
| 4. | $B_2O_3$ | 0 | 0 | 0 | 0 | 0 | 0 | 0 | 0 |
| 5. | $Al_2O_3$ | 10.48 | 10.56 | 10.48 | 10.47 | 10.57 | 10.52 | 10.53 | 10.62 |
| 6. | ZnO | 0 | 0 | 1.03 | 0 | 0.01 | 1.03 | 0 | 0 |
| 7. | MgO | 5.47 | 5.52 | 5.45 | 5.45 | 5.53 | 5.51 | 5.46 | 5.52 |
| 8. | CaO | 0 | 0 | 0 | 0 | 0 | 0 | 0 | 0 |
| 9. | $Na_2O$ | 13.84 | 13.98 | 13.88 | 13.84 | 13.98 | 13.92 | 13.79 | 12.99 |
| 10. | $K_2O$ | 0 | 0 | 0 | 0 | 0 | 0 | 0 | 0 |

The conversion into constituent phases shows that the examples which are specified in US 2017/0320769 A1 with 1-7 and 10 do not belong to the base system according to the present invention.

COMPARATIVE EXAMPLES 1027-1044

The comparative examples 1027-1044 are the embodiment examples of WO 2017/151771 A1 which correspond to the present invention there and which are specified by the alphabetic serial characters A-R there. They all contain more than 1.5% of lithium oxide and they do not belong to the base system according to the present invention.

COMPARATIVE EXAMPLES 1045-1056

The comparative examples 1045-1056 are the embodiment examples of US 2016/251255 A1 which correspond to the present invention there and which are specified by the serial numbers 1-12 there. They all contain more than 16% of sodium oxide and they do not belong to the base system according to the present invention.

COMPARATIVE EXAMPLES 1057-1060

The comparative examples 1057-1060 are the embodiment examples of DE 10 2013 114225 A1 which correspond to the present invention there and which are specified by the serial numbers A1-A4 there. A1 is discussed in the next tables. A2 and A3 contain 5% of fluorine each.

TABLE 31

| # | Oxide | A1 Mol % |
|---|-------|----------|
| 1. | $SiO_2$ | 69.5 |
| 2. | $TiO_2$ | |
| 3. | $ZrO_2$ | |
| 4. | $B_2O_3$ | |
| 5. | $Al_2O_3$ | 10.5 |
| 6. | ZnO | |
| 7. | MgO | 3 |
| 8. | CaO | |
| 9. | $Na_2O$ | 15 |
| 10. | $K_2O$ | 2 |

The conversion into constituent phases shows that A1 belongs to the base system according to the present invention, but that it is not within the composition range according to the claims.

TABLE 32

| Constituent phase | 1 Mol % |
|-------------------|---------|
| reedmergnerite | 0 |
| albite | 44 |
| orthoclase | 16 |
| natrosilite | 22.5 |
| sodium metasilicate | 4 |
| parakeldyshite | 0 |
| narsarsukite | 0 |
| disodium zinc silicate | 0 |
| cordierite | 13.5 |
| danburite | 0 |

COMPARATIVE EXAMPLES 1061-1086

The comparative examples 1061-1086 are the examples of US 2017/0121220 A1 which correspond to the present invention there and which are specified by the serial numbers 1-26 there. In this document in its main claim a glass comprising 63-76% by mass of $SiO_2$, 0-2% by mass of $B_2O_3$, 2-12% by mass of MgO, 1-8% by mass of CaO, 14.5-19% by mass of $Na_2O$, 0-3% by mass of $K_2O$ is claimed. The examples 1-18 and 20 all contain, converted into mole percentages, more MgO than $Al_2O_3$ and they do not belong to the base system according to the present invention. Example 19 as well as the examples 21-26 contain calcium, but no boron, and they do not belong to the base system according to the present invention.

COMPARATIVE EXAMPLES 1087-1105

The comparative examples 1087-1105 are the examples of US 2017/0305789 A1 which correspond to the present invention there and which are specified by the serial numbers 1-19 there. In this document in its main claim a glass comprising 60-68 mol % of $SiO_2$, 8-12 mol % of $Al_2O_3$, 6.4-12.5 mol % of MgO, 12-20 mol % of $Na_2O$, 0.1-6 mol % of $K_2O$, 0.001-4 mol % of $ZrO_2$ is claimed, wherein the total content of $B_2O_3$, $P_2O_5$, CaO, SrO, BaO is 0-1 mol % and the following inequations are fulfilled: $2 \times Al_2O_3/SiO_2 <= 0.4$ as well as $0 < K_2O/Na_2O <= 0.3$. The examples 1-15 contain in mole percentages more MgO and $K_2O$ than $Al_2O_3$ and they do not belong to the base system according to the present invention. Example 18 is discussed below. Example 19 contains more than 13 mol % of $Al_2O_3$.

TABLE 33

| # | Oxide | 18 Mol % |
|---|-------|----------|
| 1. | $SiO_2$ | 68.6 |
| 2. | $TiO_2$ | 0 |
| 3. | $ZrO_2$ | 0.5 |
| 4. | $B_2O_3$ | 0 |
| 5. | $Al_2O_3$ | 10 |
| 6. | ZnO | 0 |
| 7. | MgO | 6.4 |
| 8. | CaO | 0 |
| 9. | $Na_2O$ | 12.5 |
| 10. | $K_2O$ | 2 |

The conversion into constituent phases shows that the example which is specified in US 2017/0305789 A1 with 18 does not belong to the base system according to the present invention.

COMPARATIVE EXAMPLES 1106-1126

The comparative examples 1106-1126 are the examples of US 2017/0260077 A1 which correspond to the present invention there and which are specified by the serial numbers 1-1 to 1-8 and 2-1 to 2-13 there. In this document in its main claim a floated glass for chemical prestress comprising 65-72% by mass of $SiO_2$, 3.6-8.6% by mass of $Al_2O_3$, 3.3-6% by mass of MgO, 6.5-9% by mass of CaO, 13-16% by mass of $Na_2O$, 0-0.9% by mass of $K_2O$ is claimed, wherein $2.2 < (Na_2O+K_2O)/Al_2O_3 < 5$, the thickness is 0.1 to 2 mm and an upper limit for the content of tin at the surface is mentioned. All examples contain in mole percentages more MgO than $Al_2O_3$ and they do not belong to the base system according to the present invention.

COMPARATIVE EXAMPLES 1127-1141

The comparative examples 1127-1141 are the examples of US 2017/0217825 A1 which correspond to the present invention there and which are specified by the serial numbers 1-8 there as well as the comparative examples thereof which are specified by the serial numbers 1-7. In this document in its main claim a structural member with a chemically tempered cover glass is claimed. The examples 1-8 contain in mole percentages more MgO than $Al_2O_3$ and they do not belong to the base system according to the present invention. The further examples which are specified as comparative examples 1-4 contain in mole percentages more MgO than $Al_2O_3$ and they do not belong to the base system according to the present invention. Comparative example 5 has the same composition like example 5. Comparative example 6 contains more than 3 mol % of BaO and it does not belong to the base system according to the present invention. Comparative example 7 does not contain $Na_2O$.

COMPARATIVE EXAMPLES 1142-1198

The comparative examples 1142-1198 are the examples of U.S. Pat. No. 8,715,829 B2 which correspond to the present invention there and which are specified by the serial numbers 1-57 there. In this document in its main claim a chemically tempered glass plate of a glass comprising 50-74 mol % of $SiO_2$, 1-10 mol % of $Al_2O_3$, 6-15 mol % of $Na_2O$, 4-15 mol % of $K_2O$, 6.5% by mass to 15 mol % of MgO, 0-0.5 mol % of CaO and 0-5 mol % of $ZrO_2$ is claimed, wherein the following is true: $SiO_2+Al_2O_3 <= 75$ mol %, 12 mol % $< Na_2O+K_2O < 25$ mol %, $MgO+CaO < 15$ mol %, wherein the thickness of the plate is 0.2-1 mm. The examples 1-57 all contain an amount of MgO and $K_2O$ in comparison to $Al_2O_3$ such that a proportion of albite of >10 mol % is not possible, and they do not belong to the base system according to the present invention.

COMPARATIVE EXAMPLES 1199-1221

The comparative examples 1199-1221 are the examples of U.S. Pat. No. 9,060,435 B2 which correspond to the present invention there and which are specified by the serial numbers 1-23 there. In this document in its main claim a chemically tempered glass plate of a glass comprising 67-75 mol % of $SiO_2$, 0-4 mol % of $Al_2O_3$, 7-15 mol % of $Na_2O$, 1-9 mol % of $K_2O$, 6-14 mol % of MgO and 0-0.7% of $ZrO_2$, 71 mol % $< SiO_2+Al_2O_3 < 75$ mol %, 12 mol % $< Na_2O+K_2O < 20$ mol %, CaO<1 mol % is claimed, wherein the thickness of the plate is <1 mm. The examples 1-23 all contain an amount of MgO and $K_2O$ in comparison to $Al_2O_3$ such that a proportion of albite of >10 mol % is not possible, and they do not belong to the base system according to the present invention.

COMPARATIVE EXAMPLES 1222-1236

The comparative examples 1222-1236 are the examples of US 2017/0107141 which correspond to the present invention there and which are specified by the serial numbers E1-E15 there. In this document in its main claim a chemically temperable glass comprising 61-75% by mass of $SiO_2$, 2.5-10% by mass of $Al_2O_3$, 6-12 mol % of MgO, 0.1-8% by mass of CaO, 14-19% by mass of $Na_2O$, 0-1.8 mol % of $K_2O$ is claimed. The examples E1-E15, apart from the examples E10, E11 which belong to the ordinary soda-lime glasses, all contain an amount of MgO and $K_2O$ in comparison to $Al_2O_3$ such that a proportion of albite of >10 mol % is not possible, and they do not belong to the base system according to the present invention. E10 and E11 contain more than 1.5% of CaO, but no boron, and they do not belong to the base system according to the present invention.

COMPARATIVE EXAMPLES 1237-1241

The comparative examples 1237-1241 are the examples of U.S. Pat. No. 9,890,073 B2 which correspond to the present invention there and which are specified by the serial numbers 1-1 to 1-3 as well as by "Example 1" and "Example 2" there. In this document in its main claim a chemically temperable glass comprising 60-75% by mass of $SiO_2$, 3.6-9% by mass of $Al_2O_3$, 2-10% by mass of MgO, 0-10% by mass of CaO, 0-3% by mass of SrO, 0-3% by mass of BaO, 10-18% by mass of $Na_2O$, 0-8% by mass of $K_2O$, 0-3% by mass of $ZrO_2$, 0-0.3% by mass of $TiO_2$, 0.005-0.2% by mass of $Fe_2O_3$, 0.02-0.4% by mass of $SO_3$ is claimed, which at the same time fulfills certain requirements with respect to the viscosity and the OH content at the surface. All examples contain an amount of MgO and $K_2O$ in comparison to $Al_2O_3$ such that a proportion of albite of >10 mol % is not possible, and they do not belong to the base system according to the present invention.

COMPARATIVE EXAMPLES 1242-1259

The comparative examples 1242-1259 are the examples of US 2016/0355431 A1 which correspond to the present invention there and which are specified by the serial numbers 1-18 there. In this document in its main claim a chemically temperable glass comprising 60-75% by mass of $SiO_2$, 3-9% by mass of $Al_2O_3$, 2-10% by mass of MgO, 3-10% by mass of CaO, 10-18% by mass of $Na_2O$, 0-4% by mass of $K_2O$, 0-3% by mass of $ZrO_2$, 0-0.3% by mass of $TiO_2$, 0.02-0.4% by mass of $SO_3$ is claimed, which at the same time fulfills certain requirements with respect to the viscosity and the temperability. All examples contain an amount of MgO and $K_2O$ in comparison to $Al_2O_3$ such that a proportion of albite of >10 mol % is not possible, or more than 1.5% of CaO without boron, and thus they do not belong to the base system according to the present invention.

COMPARATIVE EXAMPLES 1260-1283

The comparative examples 1260-1283 are the examples of US 2016/0355430 A1 which correspond to the present invention there and which are specified by the serial numbers 1-24 there. In this document in its main claim a chemically temperable glass comprising 63-75% by mass of $SiO_2$, 3-12% by mass of $Al_2O_3$, 3-10% by mass of MgO, 0.5-10% by mass of CaO, 0-3% by mass of SrO, 0-3% by mass of BaO, 10-18% by mass of $Na_2O$, 0-8% by mass of $K_2O$, 0-3% by mass of $ZrO_2$, 0.005-0.25% by mass of $Fe_2O_3$, with $2<=(Na_2O+K_2O)/Al_2O_3<=4.6$, is claimed, which at the same time fulfills a certain requirement. All examples contain an amount of MgO and $K_2O$ in comparison to $Al_2O_3$ such that a proportion of albite of >10 mol % is not possible, or more than 1.5% of CaO without boron, and they do not belong to the base system according to the present invention.

COMPARATIVE EXAMPLES 1284-1306

The comparative examples 1284-1306 are the examples of US 2017/0001903 A1 which correspond to the present invention there and which are specified by the serial numbers 1-23 there. In this document in its main claim a chemically temperable glass comprising 60-72% by mass of $SiO_2$, 4.4-10% by mass of $Al_2O_3$, 5-10.9% by mass of MgO, 0.1-5% by mass of CaO, 10-19% by mass of $Na_2O$, 0-3% by mass of $K_2O$, with $7<=RO<=11$ and $RO/(RO+R_2O)>0.2$, is claimed, wherein RO is the sum of all alkaline earth oxides and $R_2O$ is the sum of all alkali oxides, wherein this glass at the same time fulfills a certain requirement. All examples contain an amount of MgO and $K_2O$ in comparison to $Al_2O_3$ such that a proportion of albite of >10 mol % is not possible, and they do not belong to the base system according to the present invention.

COMPARATIVE EXAMPLES 1307-1332

The comparative examples 1307-1332 are the examples of US 2016/0083288 A1 which correspond to the present invention there and which are specified by the serial numbers 1-1 to 1-8, 2-1 to 2-14, 3-1 to 3-2, 4-1 to 4-2 there. In this document in its main claim a chemically temperable glass comprising 65-72% by mass of $SiO_2$, 3.4-8.6% by mass of $Al_2O_3$, 3.3-6% by mass of MgO, 6.5-9% by mass of CaO, 13-16% by mass of $Na_2O$, 0-1% by mass of $K_2O$, 0-0.2% by mass of $TiO_2$, 0.01-0.15% by mass of $Fe_2O_3$, 0.02-0.4% by mass of $SO_3$, with $1.8<=(Na_2O+K_2O)/Al_2O_3<5$, is claimed. All examples contain more than 1.5% of CaO without boron, and they do not belong to the base system according to the present invention.

COMPARATIVE EXAMPLES 1333-1423

The comparative examples 1333-1423 are the examples of U.S. Pat. No. 8,518,545 B2 which correspond to the present invention there and which are specified by the serial numbers alpha1, alpha2 and A1-A27 as well as 1-62 there. In this document in its main claim a chemically tempered glass comprising 65-85 mol % of $SiO_2$, 3-15 mol % of $Al_2O_3$, 5-15 mol % of MgO, 6.5-9% by mass of CaO, 5-15 mol % of $Na_2O$, 0-2 mol % of $K_2O$, 0-1 mol % of $ZrO_2$, with $(SiO_2+Al_2O_3)<88\%$ and $D<0.18$, wherein $D=12.8-0.123*SiO_2-0.16*Al_2O_3-0.157*MgO-0.163*ZrO_2-0.113*Na_2O$, is claimed. In the examples alpha1, alpha2, A1-A26, 1-16, 18, 20-22, 24-36, 38-49, 51-58 the sum of the proportions of $K_2O$ and MgO exceeds the proportion of $Al_2O_3$ or the difference is so little such that a proportion of albite of >10 mol % is not possible so that these glasses do not belong to the base system according to the present invention. In example 19 the content of $Al_2O_3$ is higher than 13%. This example does not belong to the base system according to the present invention. The examples A27, 59 and 62 contain calcium without boron. These examples do not belong to the base system according to the present invention. The examples 17, 23, 37, 50, 60, 61 are discussed in the following tables.

TABLE 34

| # | Oxide | 17 | 23 | 37 | 50 | 60 | 61 |
|---|-------|-----|-----|-----|-----|-----|-----|
| | | | | Mol % | | | |
| 1. | $SiO_2$ | 73 | 71.1 | 73.7 | 73.6 | 73.94 | 72.98 |
| 2. | $TiO_2$ | 0 | 0 | 0 | 0 | 0 | 0 |
| 3. | $ZrO_2$ | 0 | 0 | 0 | 0 | 0 | 0 |
| 4. | $B_2O_3$ | 0 | 0 | 0 | 0 | 0 | 0 |
| 5. | $Al_2O_3$ | 9 | 9.3 | 8.1 | 8 | 7.65 | 8.25 |
| 6. | ZnO | 0 | 0 | 0 | 0 | 0 | 0 |
| 7. | MgO | 6 | 4.1 | 4 | 5 | 4.4 | 4.6 |
| 8. | CaO | 0 | 0 | 0 | 0 | 0 | 0 |
| 9. | $Na_2O$ | 12 | 15.5 | 14.1 | 13.4 | 13.98 | 14.19 |
| 10. | $K_2O$ | 0 | 0 | 0 | 0 | 0 | 0 |

The conversion into constituent phases shows that the examples which are specified in U.S. Pat. No. 8,518,545 B2 with 17, 23, 37, 50 do not belong to the base system according to the present invention.

COMPARATIVE EXAMPLES 1424-1468

The comparative examples 1424-1468 are the examples of US 2014/0364298 A1 which correspond to the present invention there and which are specified by the serial numbers 1-45 there. According to the main claim 1 a chemically temperable glass comprising 60-75 mol % of $SiO_2$, 5-15 mol % of $Al_2O_3$, 7-12 mol % of MgO, 0-3% of CaO, 0-3% of $ZrO_2$, 10-20% of $Li_2O$, 0-8% of $Na_2O$ and 0-5% of $K_2O$ is claimed, wherein the following is true: $Li_2O+Na_2O+K_2O<25\%$ and $0.5<Li_2O/(Li_2O+Na_2O+K_2O)<1$. The numbers 1-45 all contain more than 10% of lithium oxide and they do not belong to the base system according to the present invention.

COMPARATIVE EXAMPLES 1469-1524

The comparative examples 1469-1524 are the examples of U.S. Pat. No. 9,896,374 B2 which correspond to the present invention there and which are specified by the serial numbers 1-56 there. In this document in its main claim 1 a glass comprising 62-69 mol % of $SiO_2$, 11.5-14 mol % of $Al_2O_3$, 0-14 mol % of MgO, 11-16 mol % of $Na_2O$, 0-2 mol % of $K_2O$, 0-2 mol % of $ZrO_2$ is claimed, wherein the following is true: $Na_2O—Al_2O_3<5\%$, $X=41.5-0.4*SiO_2-0.5*Al_2O_3-0.4*MgO-0.4*Na_2O<1.3$, $Z=2*SiO_2+55*Al_2O_3+22*Na_2O+15*MgO-30*B_2O_3-126*K_2O>870$. In the examples 2, 3, 5, 6, 8-12, 22-26, 31-37 the proportion of $Al_2O_3$ is >13% or the proportion of $Na_2O$ is >16%. These examples do not belong to the base system according to the present invention. In the examples 16, 17, 19, 20, 21, 27, 48, 49 the proportion of cordierite is higher than 30% and/or calcium without boron is present. These examples do not belong to the base system according to the present invention. The examples 1, 4, 7, 13, 14, 15, 18, 38, 39, 40, 41, 42, 43, 44, 45, 46, 47, 50, 52, 53, 54, 55, 56 are discussed in the following tables.

TABLE 35

| # | Oxide | 13 | 14 | 15 | 18 | 29 | 38 | 39 | 41 | 46 | 47 | 50 | 54 |
|---|---|---|---|---|---|---|---|---|---|---|---|---|---|
| 1. | $SiO_2$ | 66 | 66 | 66 | 68 | 66 | 65.3 | 66.7 | 63.4 | 68.2 | 67 | 73 | 64.5 |
| 2. | $TiO_2$ | 0 | 0 | 0 | 0 | 0 | 0 | 0 | 0 | 0 | 0 | 0 | 0 |
| 3. | $ZrO_2$ | 0 | 0 | 0 | 0 | 0 | 0 | 0 | 2 | 0 | 0 | 0 | 1 |
| 4. | $B_2O_3$ | 0 | 0 | 0 | 0 | 0 | 0 | 0 | 0 | 0 | 0 | 0 | 0 |
| 5. | $Al_2O_3$ | 11 | 12 | 13 | 11 | 11 | 10.9 | 9.8 | 10.9 | 10.9 | 11 | 9 | 11.5 |
| 6. | ZnO | 0 | 0 | 0 | 0 | 0 | 0 | 0 | 0 | 0 | 0 | 0 | 0 |
| 7. | MgO | 8 | 8 | 8 | 8 | 8 | 7.9 | 7.8 | 7.9 | 5.8 | 6 | 6 | 8 |
| 8. | CaO | 0 | 0 | 0 | 0 | 0 | 0 | 0 | 0 | 0.1 | 0 | 0 | 0 |
| 9. | $Na_2O$ | 15 | 14 | 13 | 13 | 15 | 15.8 | 15.7 | 15.8 | 15.1 | 13 | 12 | 15 |
| 10. | $K_2O$ | 0 | 0 | 0 | 0 | 0 | 0 | 0 | 0 | 0 | 2 | 0 | 0 |

The conversion into constituent phases at first shows that the examples in U.S. Pat. No. 9,896,374 B2 which are specified with 13, 14, 15, 18, 29, 38, 39, 41, 46, 47, 50, 54 do not belong to the base system according to the present invention.

TABLE 36

| # | Oxide | 1 | 4 | 7 | 30 | 40 | 42 | 43 | 44 | 45 | 52 | 53 | 55 | 56 |
|---|---|---|---|---|---|---|---|---|---|---|---|---|---|---|
| | | | | | | | Mol % | | | | | | | |
| 1. | $SiO_2$ | 64 | 62 | 60 | 64 | 63.7 | 64 | 64 | 64 | 64 | 64.5 | 64 | 65 | 64.6 |
| 2. | $TiO_2$ | 0 | 0 | 0 | 0 | 0 | 0 | 0 | 0 | 0 | 0 | 0 | 0 | 0 |
| 3. | $ZrO_2$ | 0 | 0 | 0 | 0 | 0 | 1 | 2 | 1 | 2 | 0.5 | 0.5 | 0.5 | 0.7 |
| 4. | $B_2O_3$ | 0 | 0 | 0 | 0 | 0 | 0 | 0 | 0 | 0 | 0 | 0 | 0 | 0 |
| 5. | $Al_2O_3$ | 12 | 12 | 12 | 12 | 11.4 | 12 | 12 | 12 | 12 | 12 | 12 | 12.5 | 12.1 |
| 6. | ZnO | 0 | 0 | 0 | 0 | 0 | 0 | 0 | 0 | 0 | 0 | 0 | 0 | 0 |
| 7. | MgO | 8 | 10 | 12 | 8 | 8 | 8 | 8 | 7 | 6 | 8 | 8 | 8 | 8 |
| 8. | CaO | 0 | 0 | 0 | 0 | 0 | 0 | 0 | 0 | 0 | 0 | 0 | 0 | 0 |
| 9. | $Na_2O$ | 16 | 16 | 16 | 16 | 15.9 | 15 | 14 | 16 | 16 | 15 | 15.5 | 14 | 14.6 |
| 10. | $K_2O$ | 0 | 0 | 0 | 0 | 0 | 0 | 0 | 0 | 0 | 0 | 0 | 0 | 0 |

The conversion into constituent phases shows that the examples which are specified in U.S. Pat. No. 9,896,374 B2 with 1, 4, 7, 30, 40, 42, 43, 44, 45, 52, 53, 55, 56 belong to the base system according to the present invention. But the numbers 4 and 7, due to the proportion of albite which is too low, are not within the composition range according to the present invention. The examples 1, 4, 7, 30, 40, 42, 43, 52, 53, 55 and 56, due to their proportion of natrosilite which is too high, are outside the compositions according to the present invention.

TABLE 37

| Constituent phase | 1 | 4 | 7 | 30 | 40 | 42 | 43 | 44 | 45 | 52 | 53 | 55 | 56 |
|---|---|---|---|---|---|---|---|---|---|---|---|---|---|
| | | | | | | Mol % | | | | | | | |
| reedmergnerite | 0 | 0 | 0 | 0 | 0 | 0 | 0 | 0 | 0 | 0 | 0 | 0 | 0 |
| albite | 32 | 16 | 0 | 32 | 27.2 | 32 | 32 | 40 | 48 | 32 | 32 | 36 | 32.8 |
| orthoclase | 0 | 0 | 0 | 0 | 0 | 0 | 0 | 0 | 0 | 0 | 0 | 0 | 0 |
| natrosilite | 24 | 33 | 42 | 24 | 32.4 | 24 | 24 | 13.5 | 3 | 27 | 24 | 24 | 26.4 |
| sodium metasilicate | 8 | 6 | 4 | 8 | 3.4 | 4 | 0 | 11 | 14 | 3 | 6 | 2 | 2 |
| parakeldyshite | 0 | 0 | 0 | 0 | 0 | 4 | 8 | 4 | 8 | 2 | 2 | 2 | 2.8 |
| narsarsukite | 0 | 0 | 0 | 0 | 0 | 0 | 0 | 0 | 0 | 0 | 0 | 0 | 0 |
| disodium zinc silicate | 0 | 0 | 0 | 0 | 0 | 0 | 0 | 0 | 0 | 0 | 0 | 0 | 0 |
| cordierite | 36 | 45 | 54 | 36 | 36 | 36 | 36 | 31.5 | 27 | 36 | 36 | 36 | 36 |
| danburite | 0 | 0 | 0 | 0 | 0 | 0 | 0 | 0 | 0 | 0 | 0 | 0 | 0 |

COMPARATIVE EXAMPLES 1525-1543

The comparative examples 1525-1543 are the examples of EP 2 474 511 B1 which correspond to the present invention there and which are specified by the serial numbers 1-19 there. They all do not belong to the base system according to the present invention.

Exemplary embodiments provided in accordance with the present invention are described by Table 39.

TABLE 39

| Constituent phase | A | B | C | D | E Mol % | F | G | H | I |
|---|---|---|---|---|---|---|---|---|---|
| reedmergnerite | 0 | 0 | 0 | 0 | 0 | 0 | 0 | 0 | 0 |
| albite | 32 | 40.4 | 40.4 | 20 | 43.2 | 45.9 | 46.7 | 34.7 | 47.8 |
| orthoclase | 16 | 11.6 | 12 | 24 | 11 | 11 | 11 | 11 | 11 |
| natrosilite | 18 | 11.3 | 12.8 | 25.1 | 10.9 | 9 | 6.7 | 18 | 9.2 |
| sodium metasilicate | 7 | 10.6 | 9.8 | 4.1 | 9.6 | 10.1 | 10.2 | 0.6 | 3.2 |
| parakeldyshite | 0 | 1.6 | 3.2 | 0.4 | 2.1 | 2.7 | 2.7 | 2.7 | 2.7 |
| narsarsukite | 0 | 2.4 | 1.2 | 0 | 0 | 0 | 0 | 0 | 0 |
| disodium zinc silicate | 7.5 | 3 | 1.5 | 5 | 4 | 2 | 4 | 16.7 | 16.8 |
| cordierite | 18 | 18 | 18 | 20.3 | 18.1 | 18.1 | 17.4 | 15.2 | 8 |
| danburite | 0 | 0 | 0 | 0 | 0 | 0 | 0 | 0 | 0 |
| balance | 1.5 | 1.2 | 1.2 | 1.2 | 1.1 | 1.1 | 1.1 | 1.1 | 1.1 |

The calculated properties are:

TABLE 40

| Serial No. | ISO 695: calculated removal rate/ (mg/(dm$^2$3 h)) | Characteristic number for acid resistance: | Calculated CTE/ (ppm/K) | pH value |
|---|---|---|---|---|
| A | 109.19 | 203.83 | 10.02 | 9.16 |
| B | 109.20 | 206.16 | 9.74 | 9.14 |
| C | 109.73 | 206.75 | 9.67 | 9.13 |
| D | 111.67 | 204.09 | 9.97 | 9.16 |
| E | 108.51 | 206.45 | 9.58 | 9.13 |
| F | 108.59 | 207.54 | 9.37 | 9.12 |
| G | 108.53 | 207.31 | 9.34 | 9.11 |
| H | 106.66 | 202.13 | 9.73 | 9.14 |
| I | 105.34 | 202.24 | 9.50 | 9.1 |

TABLE 41

| Serial No. | CS/ MPa | DoL/ μm |
|---|---|---|
| E | 1170 | 8 |
| F | 1150 | 11 |
| G | 1051 | 11 |

CS is the compressive prestress of the surface achieved by ion exchange in a bath of potassium nitrate at 400° C. and over 40 min, DoL (depth of layer) is the corresponding exchange depth.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, comprising:
a composition characterized by the following constituent phases:
0-60 mol % reedmergnerite;
20-60 mol % albite;
0-30 mol % orthoclase;
0-20 mol % natrosilite;
0-20 mol % sodium metasilicate;
0-20 mol % parakeldyshite;
0-20 mol % narsarsukite;
0-20 mol % disodium zinc silicate;
0-21 mol % cordierite; and
0-20 mol % danburite, wherein at least one of the proportions of narsarsukite and disodium zinc silicate is less than 1000 ppm (molar), and wherein a quotient of a coefficient of thermal expansion of the glass multiplied by 1000 (in ppm/K) and the product of a pH value and a removal rate in alkaline environment (in mg/(dm$^2$3 h)) according to ISO 695 is at least 9.0.

2. The glass of claim 1, wherein the proportion of disodium zinc silicate is at most 19 mol %.

3. The glass of claim 1, wherein the proportion of cordierite is at least one of at most 20 mol % or at least 3 mol %.

4. The glass of claim 1, wherein the proportion of albite is at least one of at least 30 mol % or at most 55 mol %.

5. The glass of claim 1, wherein the proportion of orthoclase is at least one of at least 5 mol % or at most 25 mol %.

6. The glass of claim 1, wherein the proportion of parakeldyshite is at most 5 mol %.

7. The glass of claim 1, wherein a ratio of cordierite to sodium metasilicate in mole percentages at least one of is at least 1.2 or does not exceed a value of 3.5.

8. The glass of claim 1, wherein the proportion of cordierite is higher than the proportion of orthoclase.

9. The glass of claim 1, wherein a sum of the proportion of albite, the proportion of orthoclase, and the proportion of cordierite is at least 60 mol %.

10. The glass of claim 1, wherein the proportion of disodium zinc silicate is at least 1.4 mol %.

11. The glass of claim 1, wherein the glass is free of at least one of narsarsukite, parakeldyshite, or danburite.

12. The glass of claim 1, wherein the proportion of further components in the composition is at most 3 mol %.

13. The glass of claim 1, wherein the glass has at least one of:
a characteristic acid number k of less than 208;
the removal rate in alkaline environment (in mg/(dm$^2$3 h)) according to ISO 695 of at most 112 mg/(dm$^2$3 h); or
a CTE of 6.5 to 10.5 ppm/K.

14. A glass article, comprising:

a glass having a composition characterized by the following constituent phases:

0-60 mol % reedmergnerite;

20-60 mol % albite;

0-30 mol % orthoclase;

0-20 mol % natrosilite;

0-20 mol % sodium metasilicate;

0-20 mol % parakeldyshite;

0-20 mol % narsarsukite;

0-20 mol % disodium zinc silicate;

0-21 mol % cordierite; and 0-20 mol % danburite, wherein at least one of the proportions of narsarsukite and disodium zinc silicate is less than 1000 ppm (molar), and wherein a quotient of a coefficient of thermal expansion of the glass multiplied by 1000 (in ppm/K) and the product of a pH value and a removal rate in alkaline environment (in mg/(dm$^2$3 h)) according to ISO 695 is at least 9.0.

15. The glass article of claim 14, wherein the glass has a cooling state which corresponds to a continuous cooling from a temperature T1 to a temperature T2 with a cooling rate K of at least 400K/min*600 µm/thickness of the glass article, wherein the temperature T1 is at least higher than a glass transition temperature TG of the glass and the temperature T2 is at least 150° C. lower than T1.

16. The glass article of claim 14, wherein the glass article is a pharmaceutical vessel or a thin glass having a thickness of less than 2 mm.

17. A method for the production of a glass, the method comprising:

melting glass raw materials; and cooling the melted glass raw materials to form the glass, the formed glass having a composition characterized by the following constituent phases:

0-60 mol % reedmergnerite;

20-60 mol % albite;

0-30 mol % orthoclase;

0-20 mol % natrosilite;

0-20 mol % sodium metasilicate;

0-20 mol % parakeldyshite;

0-20 mol % narsarsukite;

0-20 mol % disodium zinc silicate;

0-21 mol % cordierite; and 0-20 mol % danburite, wherein at least one of the proportions of narsarsukite and disodium zinc silicate is less than 1000 ppm (molar), wherein a quotient of a coefficient of thermal expansion of the glass multiplied by 1000 (in ppm/K) and the product of a pH value and a removal rate in alkaline environment (in mg/(dm$^2$3 h)) according to ISO 695 is at least 9.0.

18. The method of claim 17, further comprising producing a shaped glass article by down draw, overflow fusion, redrawing, floating or tube drawing.

*    *    *    *    *